United States Patent
Araki et al.

(10) Patent No.: US 6,640,042 B2
(45) Date of Patent: *Oct. 28, 2003

(54) OPTICAL FIBER HOLDER

(75) Inventors: Hideo Araki, Kawasaki (JP); Minoru Oyama, Kawasaki (JP); Masahiko Saitoh, Kawasaki (JP); Yasunori Kawanami, Kawasaki (JP); Teruo Kikuchi, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/386,839

(22) Filed: Aug. 31, 1999

(65) Prior Publication Data
US 2002/0003940 A1 Jan. 10, 2002

(30) Foreign Application Priority Data
Sep. 1, 1998 (JP) ............................................. 10-247383

(51) Int. Cl.[7] ................................................. G02B 6/00
(52) U.S. Cl. ........................... 385/137; 385/135; 385/65
(58) Field of Search ................................. 385/137, 135, 385/134, 65, 83

(56) References Cited
U.S. PATENT DOCUMENTS

| | | | | |
|---|---|---|---|---|
| 4,458,985 A | * | 7/1984 | Balliet et al. ............. 350/96.21 |
| 4,750,804 A | * | 6/1988 | Osaka et al. .................. 385/55 |
| 4,854,661 A | * | 8/1989 | Cooper et al. ................. 385/99 |
| 5,515,472 A | * | 5/1996 | Mullaney et al. ............ 385/135 |
| 5,528,719 A | * | 6/1996 | Yamada ....................... 385/137 |
| 5,566,269 A | * | 10/1996 | Eberle, Jr. et al. .......... 385/137 |
| 5,668,909 A | * | 9/1997 | Mozzati ...................... 385/134 |
| 5,671,315 A | * | 9/1997 | Tabuchi et al. ............. 385/137 |

FOREIGN PATENT DOCUMENTS

| | | | |
|---|---|---|---|
| JP | 63148205 A | * | 6/1988 |
| JP | 6-25808 | | 2/1994 |
| JP | 7-199015 | | 8/1995 |
| JP | 8-240725 | | 9/1996 |
| JP | 8-320418 | | 12/1996 |
| JP | 9-113738 | | 5/1997 |
| JP | 10-20128 | | 1/1998 |

* cited by examiner

Primary Examiner—Brian Healy
Assistant Examiner—Sung Pak
(74) Attorney, Agent, or Firm—Staas & Halsey LLP

(57) ABSTRACT

An optical fiber holder which is suitable for holding a plurality of optical fibers arranged side by side at uniform intervals is provided. This optical fiber holder includes a holder body and a presser member. The holder body has an optical fiber accommodating unit which accommodates connection portions of optical fibers respectively inserted in recess portions defined by first protrusions at uniform intervals. The presser member has second protrusions in positions corresponding to the first protrusions of the holder body, and covers the optical fiber accommodating unit. Thus, the optical fiber holder can hold a large number of optical fibers side by side at uniform intervals while maintaining high density.

20 Claims, 31 Drawing Sheets

OPTICAL FIBER HOLDER

BACKGROUND OF THE INVENTION

1. Field of the Invention

The present invention generally relates to an optical fiber holder which can securely and orderly holds the connection portions of optical fibers.

Various types of communication and processing and transmission of information signals are carried out by virtue of light as a transmission medium that can cope with large volumes of signal transmission. Optical fibers, which are suitable for large-volume, long-distance transmission of multiplexed optical signals, are being widely used today. Various apparatuses can be used as signal processing apparatuses and transmission/reception apparatuses. Such apparatuses are placed in desired positions both indoors and outdoors. Although each apparatus is internally made to have high density, there are a number of restrictions on installing optical fibers inside the apparatus.

In each apparatus, it is necessary to connect optical fibers between components. Accordingly, optical connectors for detachable connection, and welding for permanent connection hereinafter referred to simply as "splice connection" or "connection portion") can be applied in connecting optical fibers.

An optical connector can easily connect and separate optical fibers to and from each other. However, attaching optical connectors to an apparatus requires a long period of time and special equipment as well as skill. Moreover, attaching and detaching optical fibers to and from optical connectors, and the optical connectors themselves take up a large space in the apparatus.

Though non-detachable, splice connection has the following advantages: short operation time; little transmission loss and high reliability; and small space required for directly connecting optical fibers. A splice connection can be made by connecting the end faces of a pair of optical fibers facing each other, or by connecting a plurality of optical fibers. Such a splice connection can be applied in gathering optical signals from optical fibers and dispersing optical signals into optical fibers, where necessary.

2. Description of the Related Art

FIG. 1A is a perspective view of an example of the connection portion of optical fibers. The connection portion 1 is made by welding the end faces of a pair of single-core optical fibers 2 facing each other. The coating on the end faces of the optical fibers 2 is removed, and the centers of the two optical fiber wires are precisely matched with each other, and are welded by arc discharge heat. The connected parts of the wires are coated with a synthetic resin (not shown), and are thus shielded. FIG. 1B is a sectional view of the connection portion 1 of FIG. 1A. A metal line 3 made from stainless steel for strengthening the connection portion 1 extends in the longitudinal direction, and the entire connection portion 1 is covered with a coating 5 for protection. Although not shown in the figures, the optical fibers 2 actually extend over great distances from both ends of the connection portion 1.

The optical fibers 2 cannot be installed as they are shown in the figures in the apparatus, because the weight of the connection portion 1 is applied as a load onto the optical fibers 2. Therefore, it is necessary to employ a holding unit to support the connection portion 1. Furthermore, since a number of connection portions of optical fibers often exist in an apparatus, each holding unit needs to have special means to avoid confusion.

FIG. 2 is an exploded view of a conventional holding unit developed in response to the above demand. In an apparatus, screw holes 12 for attachment are formed in the surface of the printed board 11 of a printed board unit, and a plurality of connection portions 1 of optical fibers are arranged in parallel. A presser plate having a width corresponding to the total width of the connection portions 1 is placed on the aligned connection portions 1 and is screwed to the printed board 11 with screws 16. The presser plate 15 is a conventional optical fiber holder.

FIG. 3 is a front view of the conventional optical fiber holder screwed to the printed board. The connection portions 1 are orderly aligned and tightly held, as shown in the figure. The optical fiber holder 15 may be made of a given synthetic resin or metal, and is preferably made of an aluminum alloy plate or a stainless steel plate for ease of formation depending on the total width of the connection portions 1.

Since the shape of the section of each connection portion 1 is elliptical or oval as shown in FIG. 1B, it is necessary to shift the connection portions 1 when the optical fiber holder 15 is placed over them. If each of the connection portions 1 is pushed in the direction of the wider diameter, the connection portions 1 are automatically rotated so that they are pushed in the direction of the narrower diameter. In such a case, twists are caused to the optical fibers 2. If the optical fibers 2 do not have enough extra lengths to allow such twists, twisting stresses are internally caused, thereby reducing the optical transmission rate of the optical fibers.

Also, if some of the connection portions 1 are pressed in the direction of the wider diameter while the other are pressed in the direction of the narrower diameter, those pressed in the direction of the wider diameter can be secured, but those pressed in the direction of the narrower diameter each leave a gap from the optical fiber holder 15. As a result, the connection portions 1 pressed in the direction of the narrower diameter are insecure and might slip off the optical fiber holder 15. In order to avoid this, it is necessary to take the trouble to position the connection portions 1 of the optical fibers 2 all in the same direction.

In a case where the number of connection portions 1 increases beyond the capacity of an area reserved for disposing the connection portions 1, it is necessary to keep another area as shown in FIG. 4. In view of the density of the entire apparatus, however, it is difficult to keep a reasonably large area as shown in FIG. 4. The connection portions 1 are inevitably dispersed, or the structure of the apparatus is made more complicated so as to create a large area for disposing the connection portions 1. Furthermore, a connection portion disposing area cannot be set anywhere, but it has to be situated on or in the vicinity of the paths of the optical fibers. It also has to be situated in a place where connecting and disconnecting operations can easily be carried out.

SUMMARY OF THE INVENTION

It is a general object of the present invention is to provide an optical fiber holder in which the above disadvantages are eliminated.

A more specific object of the present invention is to provide an optical fiber holder which accommodates coated connection portions of optical fibers orderly arranged side by side at predetermined intervals while maintaining high density.

The above objects of the present invention are achieved by an optical fiber holder comprising: a holder body including an optical fiber accommodating unit having recess portions defined by first protrusions arranged side by side, coated connection portions of optical fibers being respectively accommodated in the recess portions; and a presser member attached to the holder body, the presser member having second protrusions corresponding to the first protrusions and covering the coated connection portions of the optical fibers.

Since the connection portions of optical fibers are respectively inserted in the separate recess portions of the optical fiber accommodating unit, the connection portions can be accurately positioned in a desired state. Also, the presser member covering the connection portions further stabilizes the connection portions in the separate recess portions.

The above objects of the present invention are also achieved by an optical fiber holder comprising a holder body which includes: an optical fiber accommodating unit having recess portions defined by first protrusions arranged side by side, coated connection portions of optical fibers being respectively accommodated in the recess portions; and second protrusions formed on the rear surface of the optical fiber accommodating unit, the second protrusions corresponding to the first protrusions.

With this structure, a plurality of holder body can be laminated on one another to accommodate a large number of connection portions of optical fibers. In such a case, the bottom surface of an upper one of the holder bodies presses on the connection portions accommodated by a lower one of the holder bodies. The recess portions of the lower holder body are completely partitioned by the protrusions formed on the rear surface of the optical fiber accommodating unit of the upper holder body, thereby further stabilizing the connecting portions accommodated in the lower holder body.

The above objects of the present invention are also achieved by an optical fiber holder comprising a holder body which includes: an optical fiber accommodating unit having recess portions defined by first protrusions arranged side by side, coated connection portions of optical fibers being respectively accommodated in the recess portions; and a plurality of attachment holes are respectively formed on both sides of the optical fiber accommodating unit, said plurality of attachment holes include screw holes and screw insertion through holes.

If a plurality of holder bodies are laminated on one another, the lowermost holder body is attached to the attachment surface by screws, while the holder body directly above the lowermost holder body can be attached to the lowermost holder body by putting the screws into the screw holes of the lowermost holder body. Thus, the lengths of all the screws can be made uniform.

The above objects of the present invention are also achieved by an optical fiber holder comprising a holder body including optical fiber guide notches formed at uniform intervals in side walls facing each other, and an optical fiber accommodating unit having an inner flat surface which is an adhesive surface for positioning coated connecting portions of optical fibers accommodated in the optical fiber accommodating unit; and a presser member attached to the holder body, the presser member covering the optical fiber accommodating unit.

With this structure, the connection portions of optical fibers can be orderly positioned by the optical fiber guide notches formed on both sides of the optical fiber accommodating unit, and the connection portions are also stabilized by the adhesive surface in the optical fiber accommodating unit. Thus, the connection portions of optical fibers can be stabilized in a desired state.

The above objects of the present invention are also achieved by an optical fiber holder comprising a holder body which includes: an optical fiber guide notches formed at uniform intervals in side walls facing each other; an optical fiber accommodating unit having an inner flat surface which is an adhesive surface for positioning coated connection portions of optical fibers accommodated therein; and a plurality of attachment holes formed on both sides of the optical fiber accommodating unit, the plurality of attachment holes including screw holes and screw insertion through holes.

If a plurality of holder bodies are laminated on one another, the lowermost holder body is attached to the attachment surface by screws, while the holder body directly above the lowermost holder body can be attached to the lowermost holder body by putting the screws into the screw holes of the lowermost holder body. Thus, the lengths of all the screws can be made uniform.

The above and other objects and features of the present invention will become more apparent from the following description taken in conjunction with the accompanying drawings.

DESCRIPTION OF THE PREFERRED EMBODIMENTS

Figure 1A:
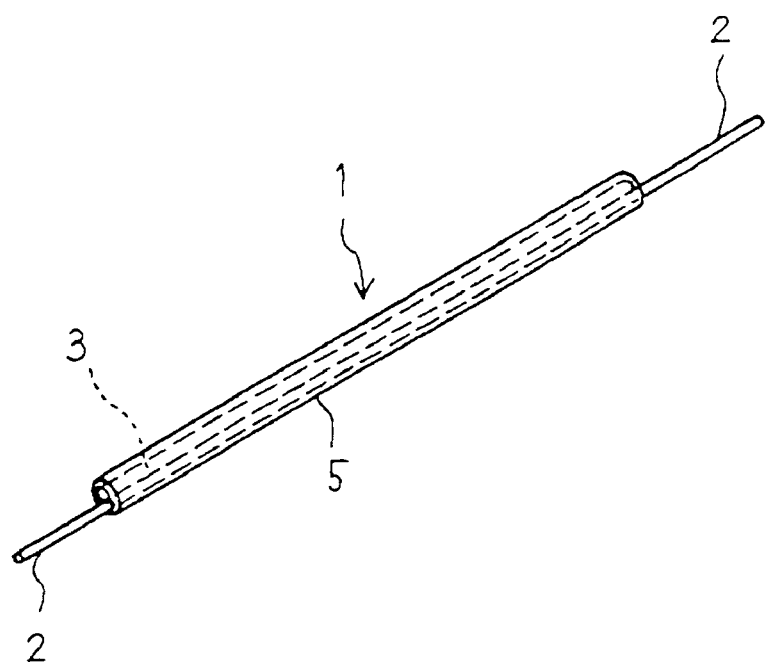
FIG. 1A is a perspective view of a connection portion of a pair of optical fibers of the prior art.

The following is a description of preferred embodiments of the present invention, with reference to the accompanying drawings. For ease of explanation, like components are indicated by like reference numerals throughout the drawings.

Figure 5A:
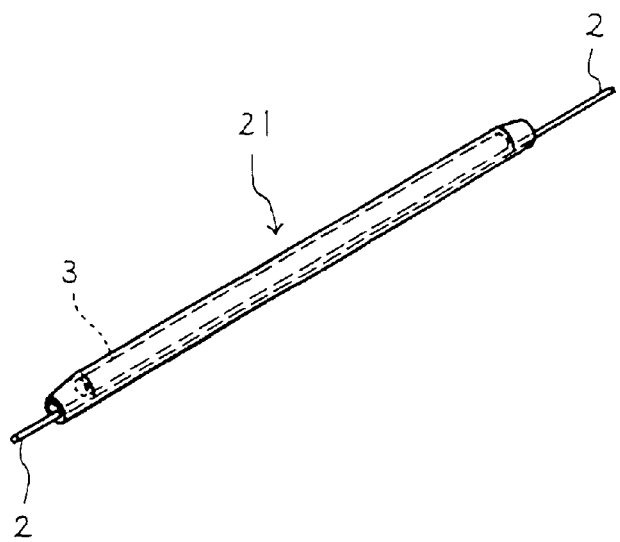
FIG. 5A is a perspective view of a connection portion of a pair of optical fibers of the present invention.
Figure 5B:
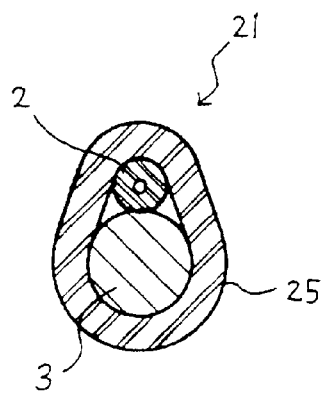
FIG. 5B is a sectional view of the connection portion shown in FIG. 5A.

FIG. 5A is a perspective view of a connection portion of a pair of optical fibers, and FIG. 5B is a sectional view of the connection portion. This connection portion 21 is made by welding the end faces of a pair of single-core optical fibers 2 facing each other. The coating on the end faces of the optical fibers 2 is removed, and the centers of the two optical fiber wires are precisely matched with each other, and are welded by arc discharge heat. The connected parts of the wires are coated with a synthetic resin (not shown), and are thus shielded. As shown in FIG. 5B, a metal line 3 made from stainless steel for strengthening the connection portion 21 extends in the longitudinal direction, and the entire connection portion 21 is covered with a conventional synthetic resin tube 25 for protection. Although not shown in the figures, the optical fibers 2 actually extend over great distances from both ends of the connection portion 21.

Figure 6:
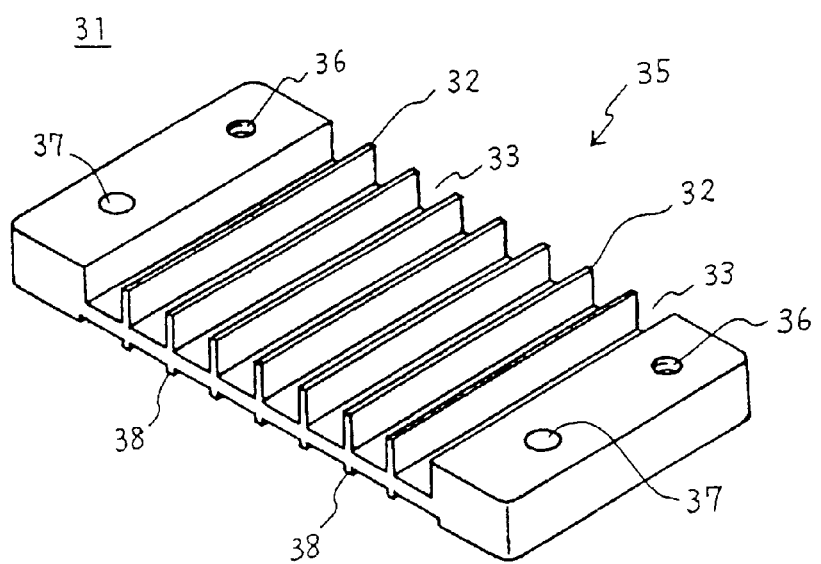
FIG. 6 is a perspective view of a holder main body of a first embodiment of an optical fiber holder of the present invention.
Figure 7A:
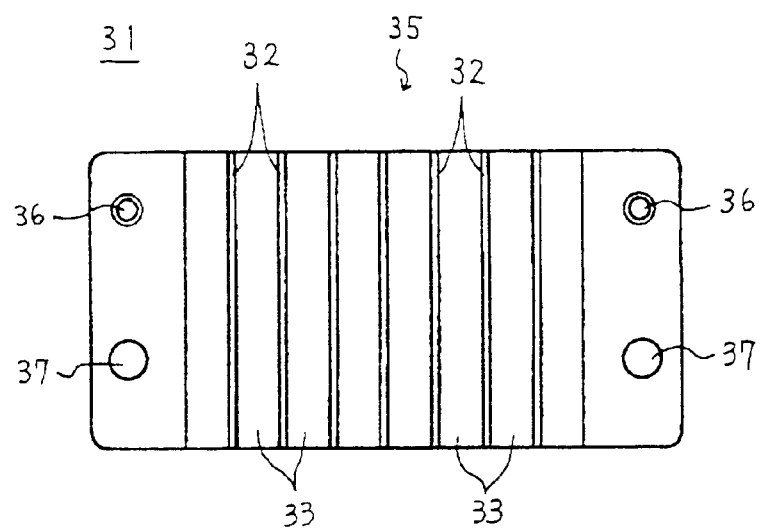
FIG. 7A is a plan view of the holder main body shown in FIG. 6.
Figure 7B:
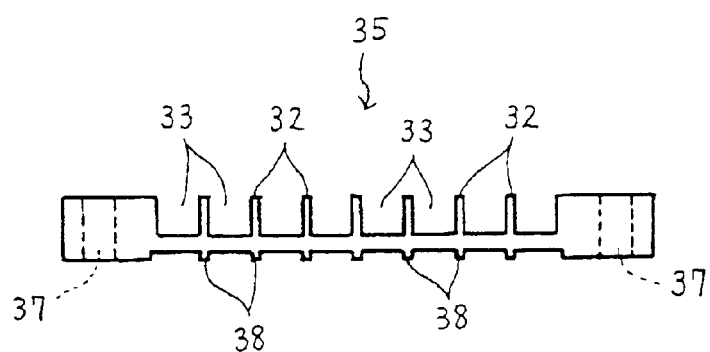
FIG. 7B is a front view of the holder main body shown in FIG. 6.

FIG. 6 is a perspective view of a holder main body of a first embodiment of the optical fiber holder of the present invention. FIGS. 7A and 7B are a plan view and a front view of the holder main body.

As shown in FIGS. 7A and 7B, the holder main body 31 has an optical fiber accommodating unit 35 comprising sections 33 that are recess portions defined by a plurality of walls 32 formed on the rectangular upper surface. Through holes 36 and 37 for attachment are formed on both sides of the optical fiber accommodating unit 35. The through holes 36 on both sides are a pair of screw holes, while the through holes 37 on both sides are a pair of screw insertion holes. On the reverse surface of the optical fiber accommodating unit 35, protrusions 38 are formed in the positions corresponding to the walls 32. The holder main body 31 is integrally molded from light alloy such as aluminum, or ABS resin for its excellent moldability, mechanical strength, and dimensional stability. As can be seen from FIG. 7B, the concave sections 33 are deep, while the recess portions defined by the protrusions 38 are shallow.

Figure 8A:
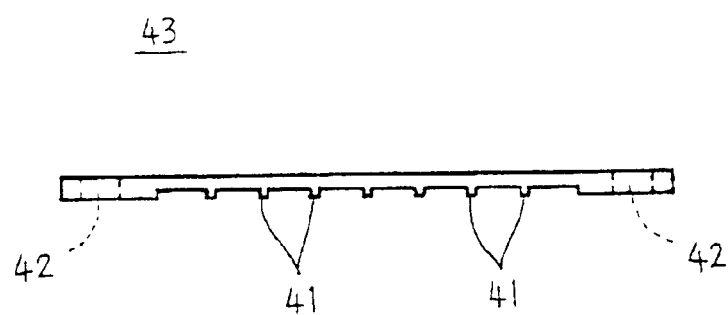
FIG. 8A is a front view of a presser member of the first embodiment of an optical fiber holder of the present invention.
Figure 8B:
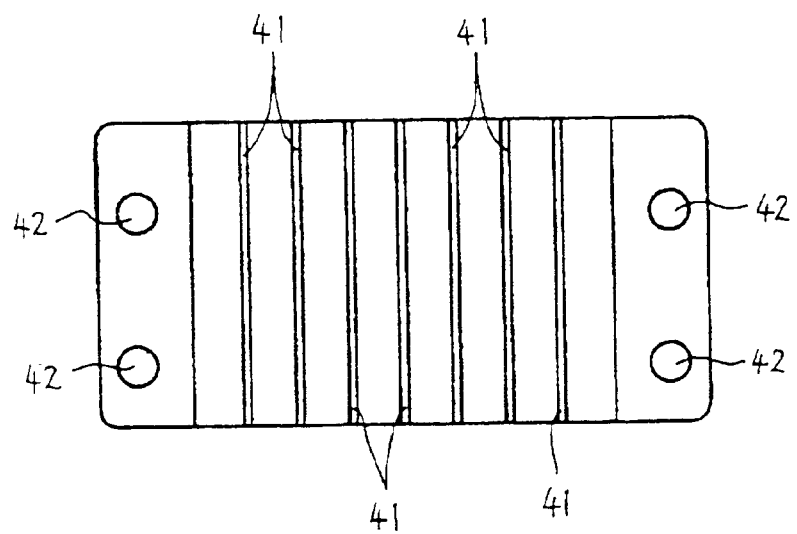
FIG. 8B is a reverse view of the presser member shown in FIG. 8A.

FIG. 8A is a front view of a presser member 43 which comprises protrusions 41 and through holes 42, and FIG. 8B is a reverse view of the presser member 43. The protrusions 41 are formed on the reverse side surface of the presser member 43 in the positions corresponding to the walls 32 of the holder main body 31. The reverse side surface of the presser member 43 is thinner than the holder main body 31, but has the same rectangular shape as the holder main body 31. The through holes 42 are formed as pairs on both sides of the presser member 43. One of the pairs of through holes 42 are situated in the positions corresponding to the screw holes 36 of the holder main body 31. The other pair of through holes 42 are situated in the positions corresponding to the screw insertion holes 37 of the holder main body 31. The presser member 43 is also integrally molded from aluminum alloy or synthetic resin.

Figure 9:
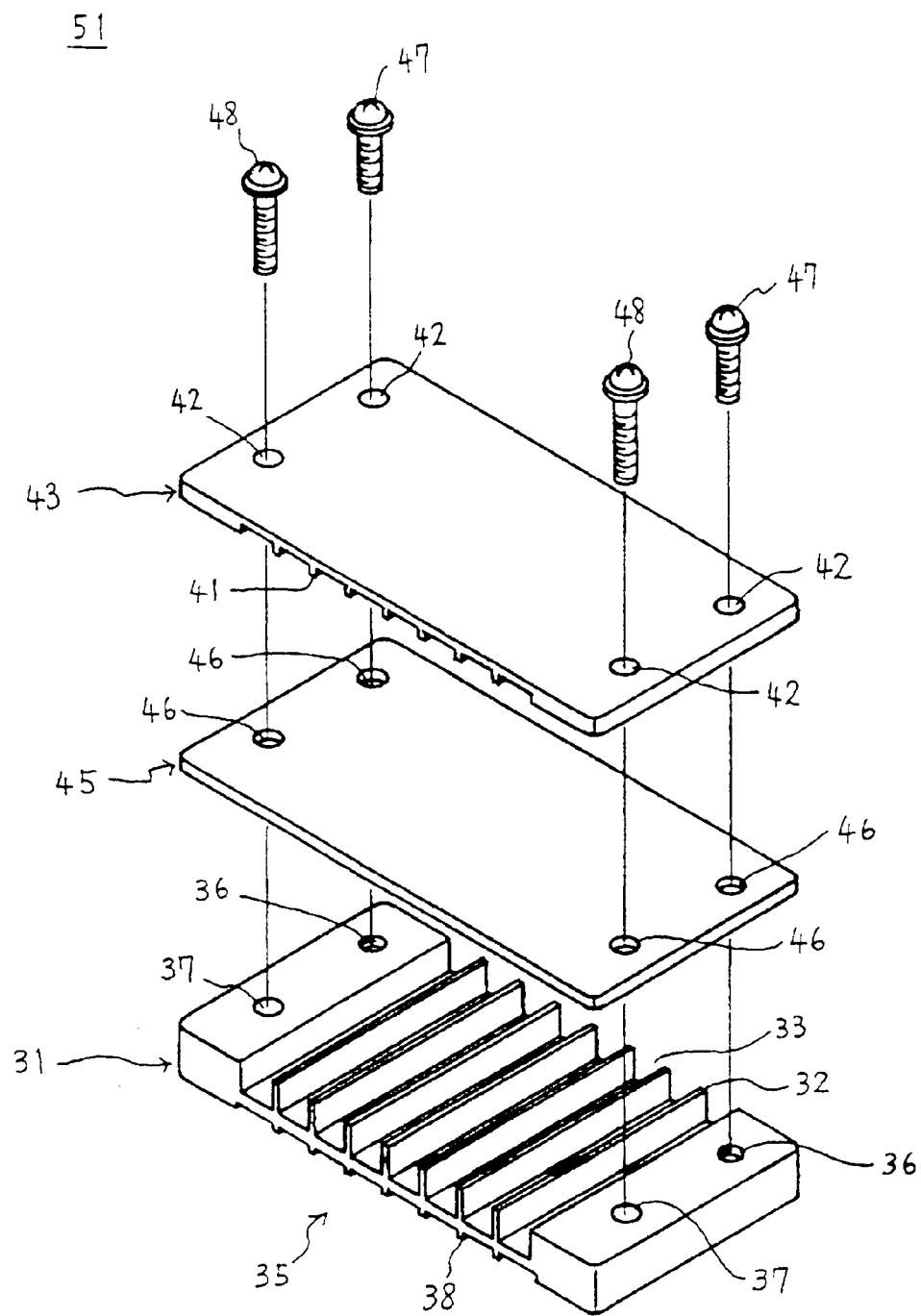
FIG. 9 is an exploded view of the first embodiment of an optical fiber holder of the present invention.

FIG. 9 illustrates the positional relationship between the holder main body 31 and the presser member 43. The optical fiber accommodating unit 35 of the holder main body 31 and the reverse surface of the presser member 43 face each other, and a plate-type elastic member 45 is interposed between them. The elastic member 45 is provided with two pairs of through holes 46 on both sides, and is preferably a sheet made from flexible synthetic rubber or a sponge sheet made from such type of rubber. For instance, rubber materials such as urethane rubber or chloroprene rubber are preferable for their flexibility, high friction coefficient, and long-term stability.

As shown in FIG. 9, the screws 47 are inserted into the corresponding through holes 42 and 46. The screws 47 to be inserted into the screw holes 36 of the holder main body 31 are shorter than the screws 48 to be inserted into the screw insertion holes 37.

The connection portions 21 of the optical fibers shown in FIGS. 5A and 5B are arranged in the sections 33 of the optical fiber accommodating unit 35 of the holder main body 31. In FIG. 9, the screws 47 are tightened into the screw holes 36 of the holder main body 31, thereby integrally attaching the connection portions 21 of the optical fibers and the optical fiber holder 51.

Figure 10:
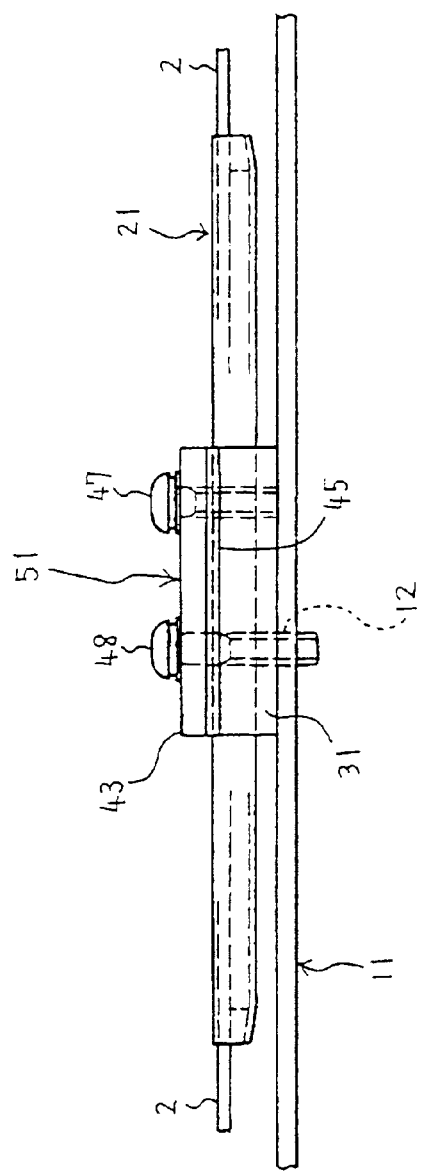
FIG. 10 is a side view of the first embodiment of an optical fiber holder of the present invention.

As shown in FIG. 10, the screws 48 are tightened into the screw holes 12 in the printed board 11 of the printed board unit through the optical fiber holder 51, so that the optical fiber holder 5 can be secured to the printed board 11.

Figure 11A:
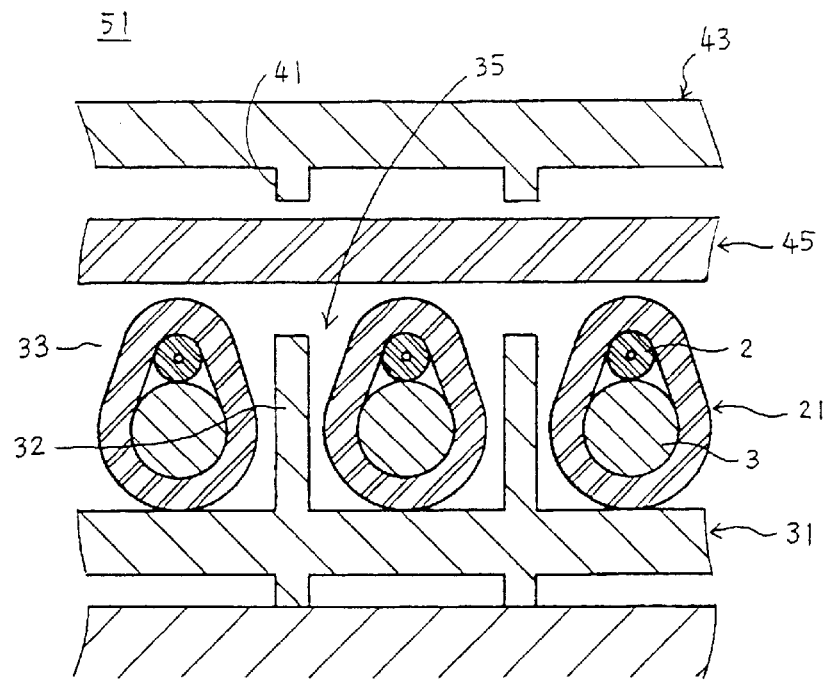
FIGS. 11A and 11B illustrates a tightening process in the first embodiment of an optical fiber holder of the present invention.

FIG. 11A illustrates a state of the optical fiber holder 51 immediately before the presser plate 43 tightens it. In this figure, the connection portions 21 of the optical fibers are arranged and inserted in the sections 33 of the optical fiber accommodating unit 35 of the holder main body 31, so that the metal wires 3 of the respective connection portions 21 are situated on the bottom side of the sections 33 and the optical fibers 2 are situated on the upper side. For ease of explanation, gaps are shown between the connection portions 21 and the walls 32. However, these gaps are actually made as small as possible so as to prevent the connection portions 21 from rotating when inserted. Accordingly, the optical fibers 2 never face the walls 32, through some spaces are allowed.

As can be seen from the figure, the depth of each section 33 is set so that the top portion of each connection portion 21 slightly protrudes from the top surfaces of the walls 32 of the optical fiber accommodating unit 35.

Figure 11B:
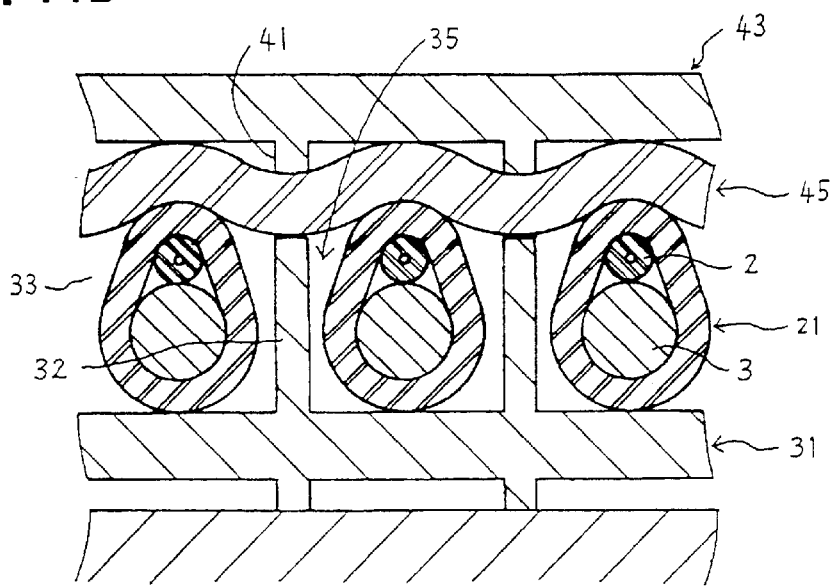

FIG. 11B illustrates a state of the optical fiber holder 51 when the presser plate 43 presses toward the holder main body 31, but the screws 47 and 48 are not completely tightened. In this figure, the elastic member 45 is deformed due to its elasticity, and has a wave-like shape in contact with the tope surfaces of the walls 32, the protrusions 41 of the presser member 43, the top portions of the connection portions 21, and the lower surface of the presser member 43.

By tightening the screws 47 or 48 in the state shown in FIG. 11B, the presser member 45 is deformed, but never pushes excessively the connection portions 21. Thus, the connecting portions 21 are held with a desired amount of pushing force. In this manner, the light transmission characteristics of the optical fibers 2 are not adversely affected, and the connection portions 21 can be prevented from shifting in any other direction. This is the state of the optical fiber holder shown in FIG. 10.

Since the optical fiber holder 51 does not press on the entire length of each connection portion 21, the area for the optical fiber holder 51 does not need to be large. Also, the connection portions 21 are orderly arranged, and the thickness of each wall 32 is made minimum, so that the area for the optical fiber holder 51 is not large in the width direction.

Figure 12:
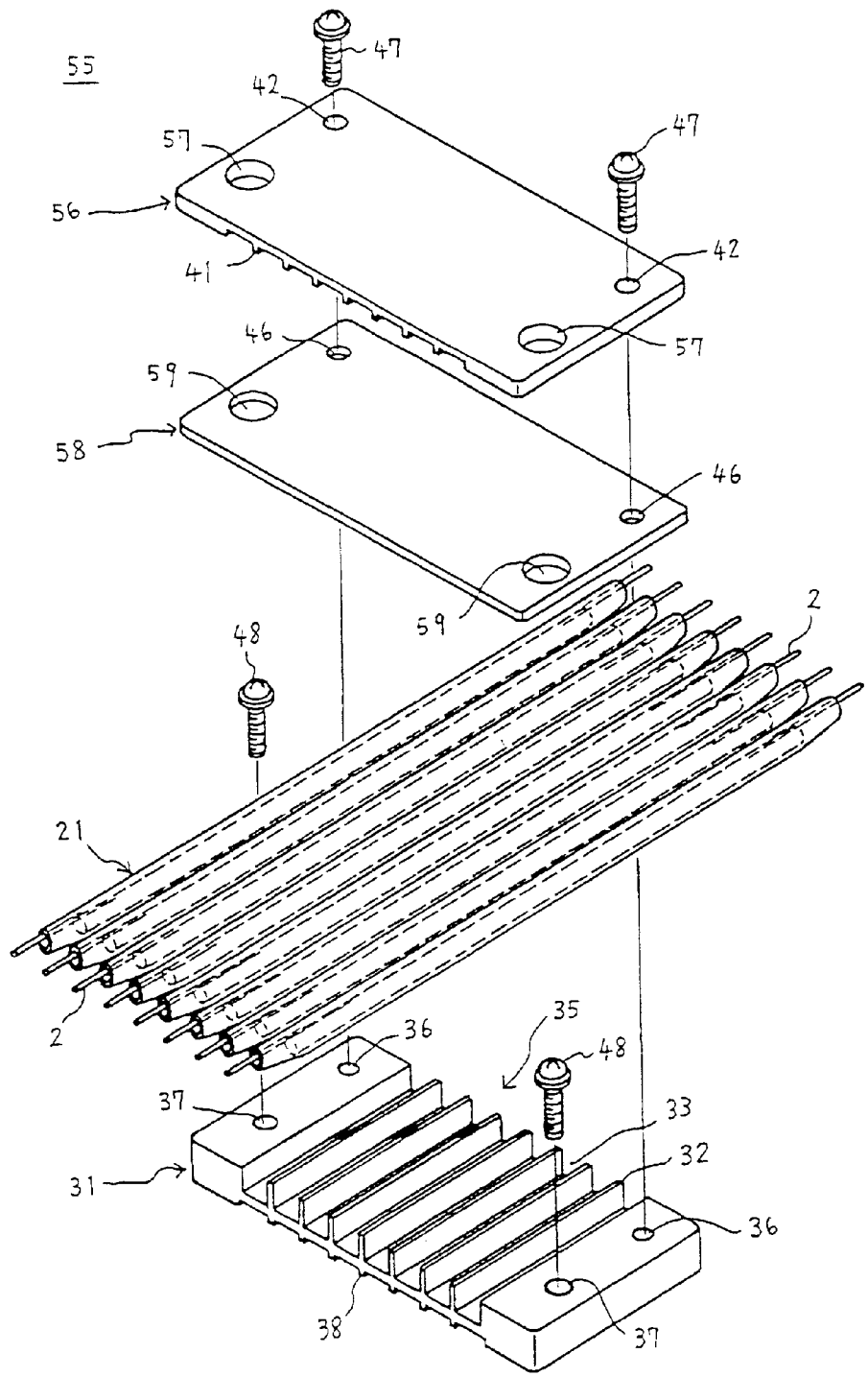
FIG. 12 is an exploded view of a second embodiment of an optical fiber holder of the present invention.

FIG. 12 is an exploded view of a second embodiment of the optical fiber holder of the present invention. The connection portions 21 of the optical fibers are the same as those shown in FIG. 5A, and the holder main body 31 is also the same as in the first embodiment.

The optical fiber holder 55 differs from the first embodiment in that a pair of through holes 57 of a presser member 56 are larger than in the first embodiment, and that a pair of through holes 59 of an elastic member 58 are larger than in the first embodiment. The other pair of through holes 42 of the presser member 56 are just large enough to insert the screws 47 thereinto, while the larger through holes 57 are large enough to allow the heads of the screws 48 to penetrate therethrough. The other through holes of the elastic member 58 are just large enough to insert the screws 47 thereinto, while the larger through holes 59 are large enough to allow the heads of the screws 48 to penetrate therethrough.

The optical fiber holder 55 is assembled in the same manner as illustrated in FIG. 10. The connection portions 21 of the optical fibers are arranged and inserted into the optical fiber accommodating unit 35 of the holder main body, the elastic member is then placed over the optical fiber accommodating unit 35, and the presser member 56 is secured to the holder main body 31 by the screws 47.

The assembling procedures so far are the same as in the first embodiment. However, it should be noted that if the optical fiber holder 58 is secured onto the printed board 11 by tightening the screws 48, the heads of the screws 48 penetrate through the through holes 57 and 59, and press directly on the holder main body 31, because the through holes 57 of the presser member 56 and the through holes 59 of the elastic member 58 are larger than the heads of the screws 48. The screws 48 pressing directly on the holder main body 31 do not function to secure the connection portions 21 of the optical fibers, but function to secure the holder main body 31 to the attachment portion of the printed board 11. As a result, the connecting portions 21 are held only by the screws 47.

It becomes apparent here that, with the optical fiber holder 55 being attached to the attachment portion of the printed board 11, the connection portions 21 of the optical fibers can be attached and detached only by tightening and loosening the screws 47. In other words, it is possible to secure the holder main body 31 to the attachment portion of the printed board 11 in advance, arrange and insert the connection portions 21 of the optical fibers, and then attaching the elastic member 58 and the presser member 56 by the screws 47. Thus, each of the connection portions 21 of the optical fibers can be detachably disposed in the predetermined position.

Figure 13A:
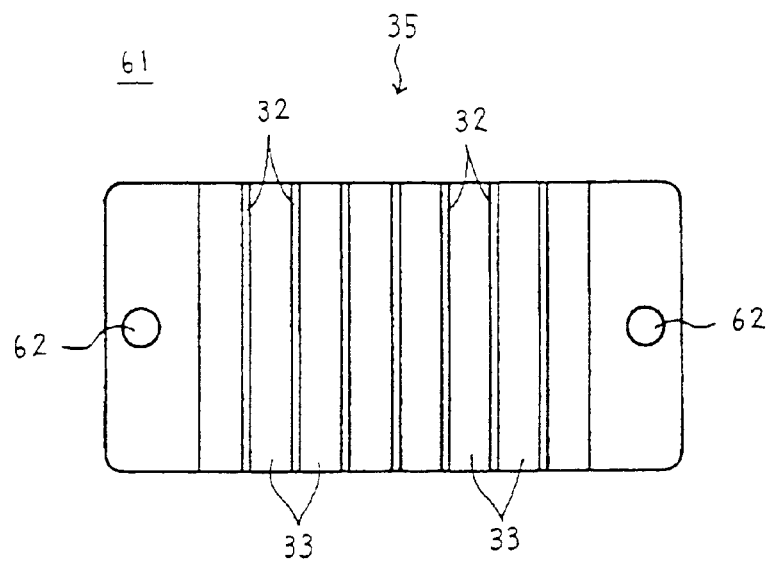
FIG. 13A is a plan view of a holder main body of a third embodiment of an optical fiber holder of the present invention.
Figure 13B:
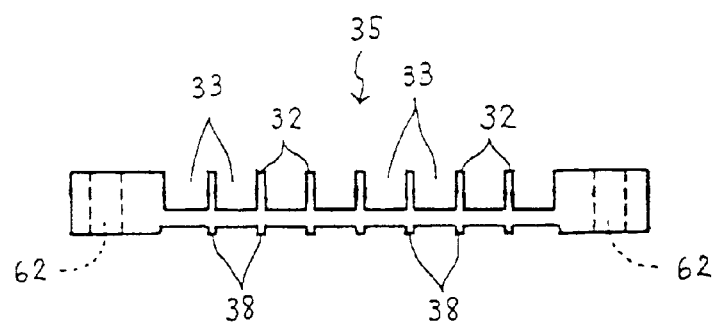
FIG. 13B is a front view of the holder main body shown in FIG. 13A.

FIGS. 13A and 13B illustrate a holder main body of a third embodiment of the optical fiber holder of the present invention. More specifically, FIG. 13A is a plan view of the holder main body, and FIG. 13B is a front view of the holder main body. The holder main body 61 is provided with a pair of through holes in the mid sections of both sides of the optical fiber accommodating unit 35. The other parts of the holder main body 61 are substantially the same as those of the holder main body 31. The material of the holder main body 61 is also the same as the holder main body 31.

Figure 14A:
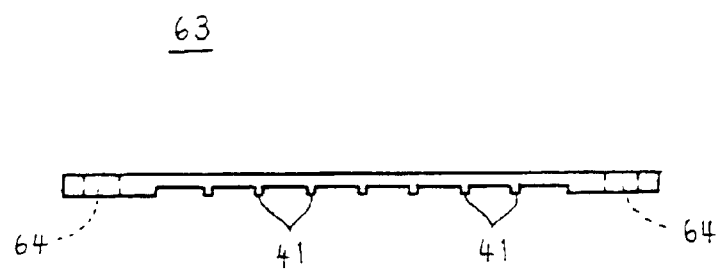
FIG. 14A is a front view of a presser member of the third embodiment of an optical fiber holder of the present invention.
Figure 14B:
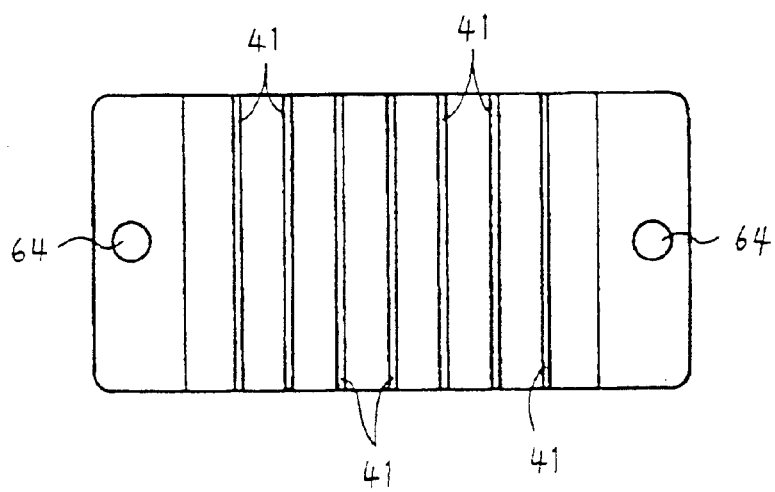
FIG. 14B is a reverse view of the presser member shown in FIG. 14A.

FIG. 14A is a front view of a presser member employed with the holder main body 61 shown in FIGS. 13A and 13B, and FIG. 14B is a reverse view of the presser member. This presser member 63 is provided with a pair of through holes 64 in the mid sections of both sides. The protrusions 41 are the same as in the presser member 43 described above, so is its material. In this configuration, the connection portions 21 of optical fibers are arranged and placed in the optical fiber accommodating unit 35 of the holder main body shown in FIGS. 13A and 13B. An elastic member having a pair of through holes is interposed between the presser member 63 and the holder main body 61. A pair of screws (not shown) are then inserted into the through holes 62 and 64 so as to attach the optical fiber holder to the predetermined position on the attachment portion. This is a simple structure requiring only one pair of screws for the attachment of the optical fiber holder.

Figure 15:
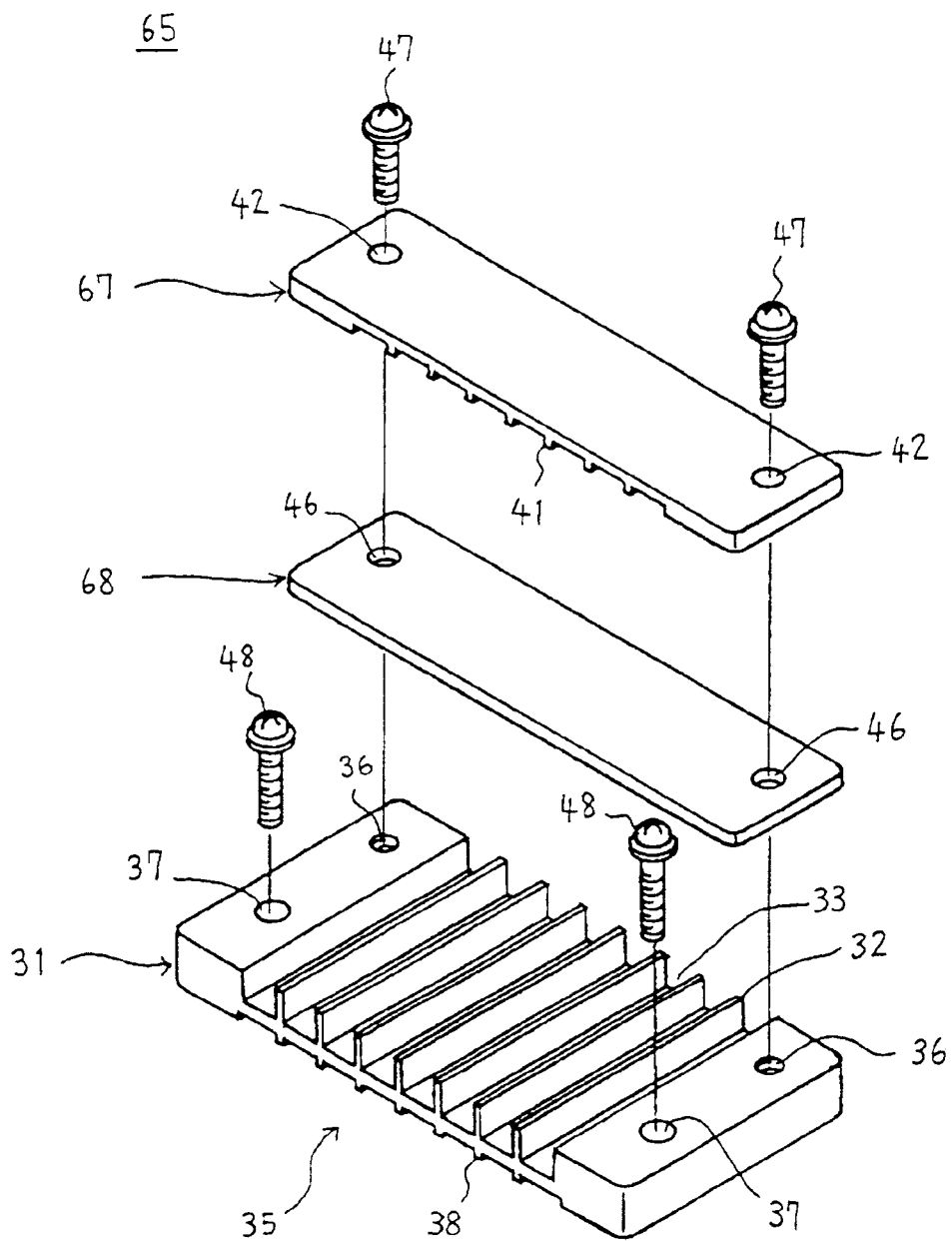
FIG. 15 is an exploded view of a fourth embodiment of an optical fiber holder of the present invention.

FIG. 15 is an exploded view of a fourth embodiment of the optical fiber holder of the present invention. Most parts of an optical fiber holder 65 of this embodiment are the same as the embodiments described so far.

The optical fiber holder 65 differs from the other embodiments in that a presser member 67 and an elastic member 68 have half the lengths of the presser member 43 and the elastic member 45 in the longitudinal direction of the connection portions 21 of optical fibers. Accordingly, the presser member 67 and the elastic member 68 each have one pair of through holes.

As shown in FIG. 15, the presser member 67 is disposed in such a position that conforms with the positions of the screw holes 36 of the optical fiber accommodating unit 35 of the holder main body 31. The plate-like elastic member 68 is interposed between the optical fiber accommodating unit 35 and the presser member 67.

The connection portions 21 of optical fibers are arranged and inserted into the section 33 of the optical fiber accommodating unit 35 of the holder main body 31. The screws 47 are tightened into the screw holes 36 of the holder main body 31 so that the connection portions 21 of the optical fibers can be held by the optical fiber holder 65. In this state, by tightening the screws 48 through the optical fiber holder 65 into the screw holes 12 in the attachment portion of the printed board 11, the optical fiber holder 65 can be secured onto the attachment portion of the printed board 11, as shown in FIG. 16.

Figure 16:
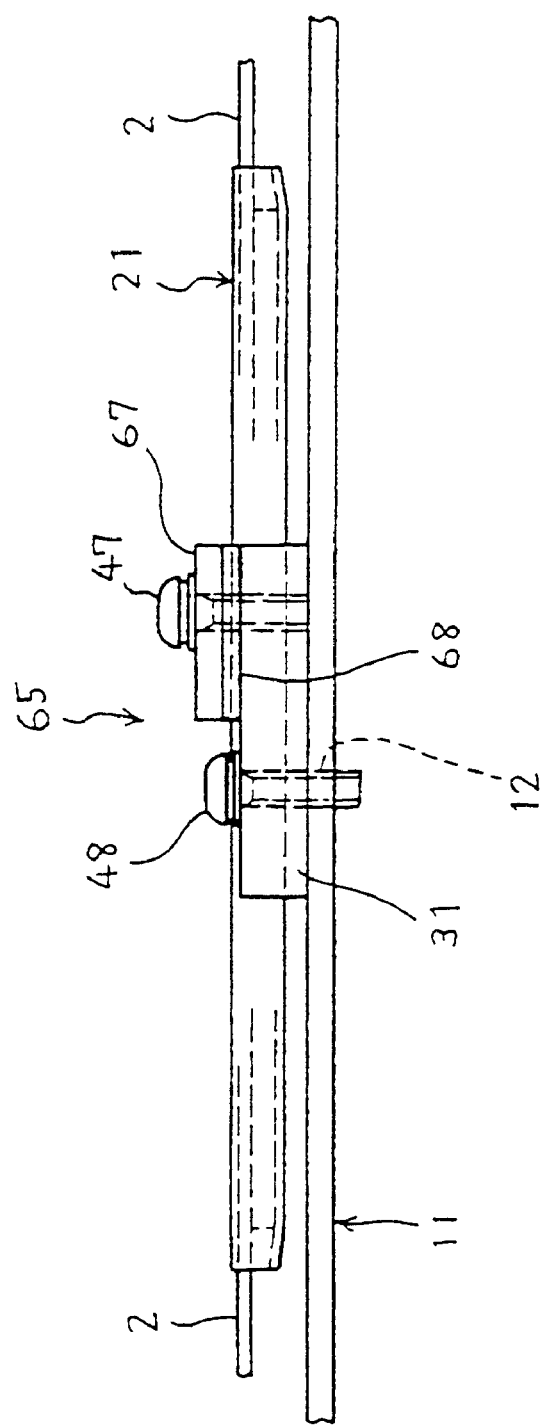
FIG. 16 is a side view of the fourth embodiment of an optical fiber holder of the present invention.

As can be seen from the FIG. 16, the screws 48 tightened into the printed board press only on the holder main body 31, and play no role in securing the presser member 67 and the elastic member 68. This is substantially the same fact as in the second embodiment shown in FIG. 12. In short, with the optical fiber holder 65 being attached to the attachment portion of the printed board 11, only the screws 47 are used to secure or release the connection portions 21 of optical fibers.

In this configuration, the holder main body 31 is secured to the attachment portion of the printed board 11 by the screws 48 in advance. The connection portions 21 of optical fibers are arranged and inserted in the optical fiber accommodating unit 35. The elastic member 68 and the presser member 67 are then secured by the screws 47. Thus, each of the connection portions 21 of optical fibers can be detachably inserted in the predetermined position in the holder main body 31.

Figure 17:
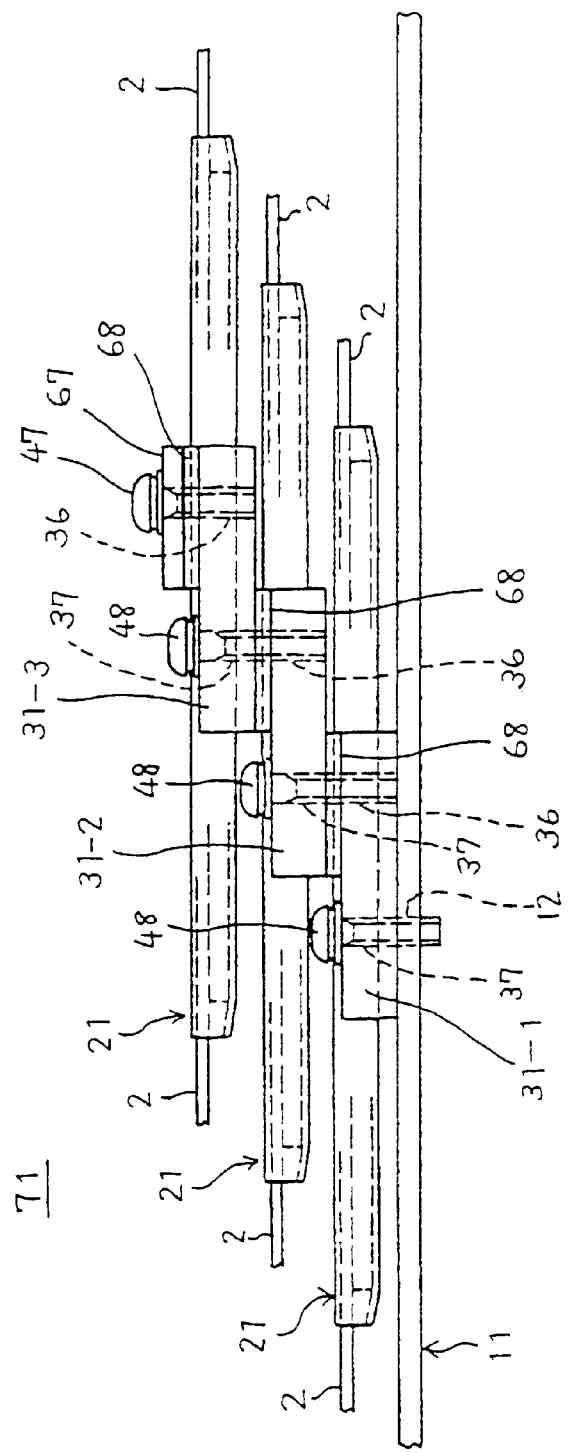
FIG. 17 is a side view of a fifth embodiment of an optical fiber holder of the present invention.

FIG. 17 is a side view of a fifth embodiment of an optical fiber holder of the present invention. In the optical fiber holder 71 of this embodiment, the screws 48 are first inserted into the screw holes 12 in the attachment portion of the printed board 11 through the screw insertion holes 37 of a first holder main body 31-1. The connection portions 21 of optical fibers are then arranged side by side and inserted in the optical fiber accommodating unit 35 of the holder main body 31-1. The elastic member 68 is placed over the first holder main body 31-1. A second holder main body 31-2 is then placed on the elastic member 68, and is slightly shifted from the elastic member 68, as shown in FIG. 17. Here, it is necessary to position the screw insertion holes 37 of the second holder main body 31-2 in conformity with the positions of the screw holes 36 of the first holder main body 31-1. The elastic member 68 is interposed in the overlapped region between the first holder main body 31-1 and the second holder main body 31-2.

The screws 48 are inserted into the screw insertion holes 37 of the second holder main body 31-2, and are put into the screw holes 36 of the first holder main body 31-1. Thus, the optical fiber connection portions 21 can be held by the first holder main body 31-1, and the second holder main body 31-2 can be secured to the first holder main body 31-1.

A plurality of optical connection portions 21 are arranged side by side and inserted in the optical fiber accommodating unit 35 of the second holder main body 31-2. A third holder main body 31-3 is then placed on the second holder main body 31-2, with the elastic member 68 being interposed between them, as in the case of placing the second holder main body 31-2 on the first holder main body 31-1. The third holder main body 31-3 is secured to the second holder main body 31-2 by the screws 48.

Likewise, a plurality of optical fiber connection portions 21 are arranged side by side and inserted in the optical fiber accommodating unit 35 of the third holder main body 31-3. The elastic member 68 and the presser member 67 are then secured by putting the screws 47 into the screw holes 36, as shown in FIG. 17.

As described above, in this embodiment, the three holder main bodies 31-1 to 31-3 are laminated stepwise, and the optical connection portions 21, the number of which is three times larger than in the foregoing embodiments, can be held in an attachment portion having the same width as in the foregoing embodiments.

It should be noted that, with this configuration, all the screws 48 are involved in attaching and securing the holder main bodies 31 and in holding the optical fiber connection portions 21, and can be independently handled for each holder main body 31. For instance, by loosening the screws 48 of the third holder main body 31-3, the third holder main body 31-3 can be detached from the second holder main body 31-2, so that the optical fiber connection portions 21 held in the optical fiber accommodating unit 35 of the second holder main body 21 can easily be detached whenever necessary. However, when the optical fiber connection portions 21 are removed from the third holder main body 31-3, the presser member 67 should be removed. This can be carried out, while the optical fiber connection portions 21 in the other holder main bodies 31-1 and 31-2 remain held in the respective optical fiber accommodating units 35. Likewise, the optical fiber connection portions 21 held in the first holder main body 31-1 can be removed, while the optical fiber connection portions 21 in the other holder main bodies 31-2 and 31-3 remain held.

The optical fiber connection portions 21 are held by the protrusions 38 of the second holder main body 31-2 and the first holder main body 31-1 via the elastic member 68. Likewise, the optical fiber connection portions 21 between the second holder main body 31-2 and the third holder main body 31-3 are held in the same manner as above.

The holder main bodies 31-1 to 31-3 can be of the same type, but the reference numerals are used for easier recognition. Also, the number of holder main bodies is not limited to 3.

Figure 18A:
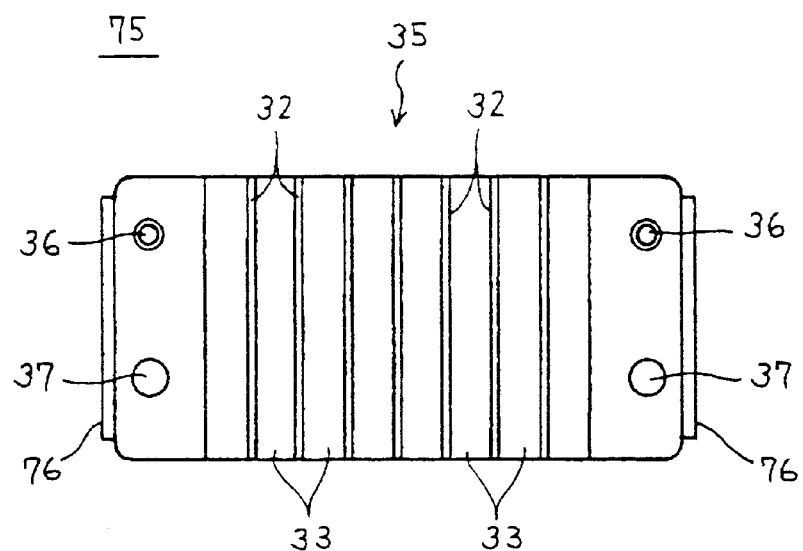
FIG. 18A is a plan view of a holder main body of a sixth embodiment of an optical fiber holder of the present invention.
Figure 18B:
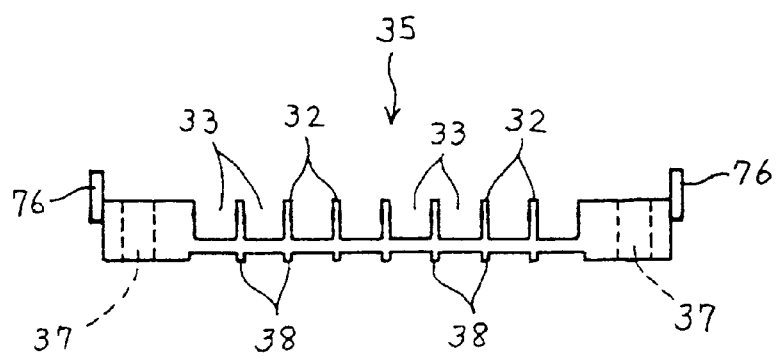
FIG. 18B is a front view of the holder main body shown in FIG. 18A.

FIGS. 18A and 18B illustrate an holder main body of a sixth embodiment of an optical fiber holder of the present invention. FIG. 18A is a plan view of the holder main body, and FIG. 18B is a front view of the holder main body. In these figures, the optical fiber holder 75 has the optical fiber accommodating unit 35. This optical fiber accommodating unit 35 is the same as that shown in FIGS. 6, 7A, and 7B. The optical fiber holder 75 of this embodiment differs from the optical fiber holder 51 of the first embodiment in that protrusions 76 situated higher than the upper surface of the optical fiber accommodating unit 35 are formed on both sides of the optical fiber accommodating unit 35.

The holder main body 75 is also integrally molded from light alloy, such as aluminum, or synthetic resin. The concave sections 33 are deep, while the concave portions defined by the protrusions 38 are shallow.

Figure 19:
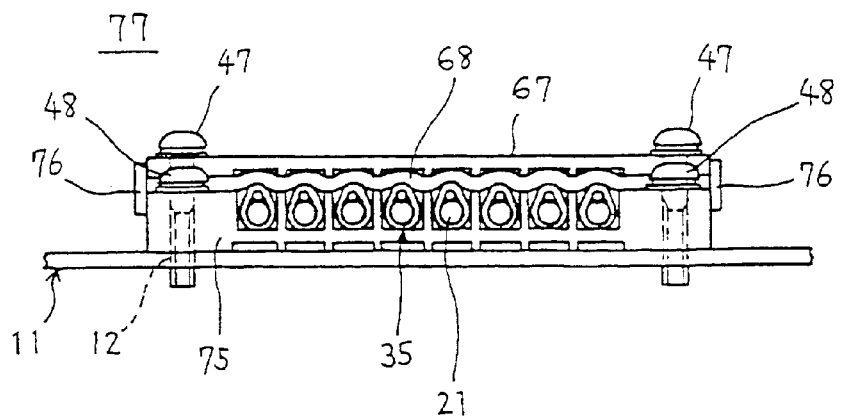
FIG. 19 is a front view of the sixth embodiment of an optical fiber holder of the present invention.

FIG. 19 is a front view of the sixth embodiment of an optical fiber holder of the present invention. As in the foregoing embodiments, the optical fiber connection portions 21 are arranged and inserted in the optical fiber accommodating unit 35 of the holder main body 75. The elastic member 68 and the presser member 67 are then secured to the holder main body 75 by the screws 47. It is possible to attach the holder main body 75 to the attachment portion of the printed board 11 by the screws 48 either before or after the optical fiber connection portions 21 are held.

The above features of this embodiment are the same as the embodiments shown in FIGS. 10 and 16, and the process of holding the optical fiber connection portions 21 is the same as the process shown in FIGS. 11A and 11B. In this embodiment, both side surfaces of the elastic member 68 and the presser member 67 are securely positioned by the protrusions 76 on both sides of the holder main body 75, so that only a pair of screws 47 are enough to secure the optical fiber holder 77 to the attachment portion of the printed board 11.

In the optical fiber holder 77 shown in FIG. 19, the optical fiber accommodating unit 35 has eight sections 33, and the widths of the presser member 67 and the elastic member 68 are adjusted accordingly.

Figure 20:
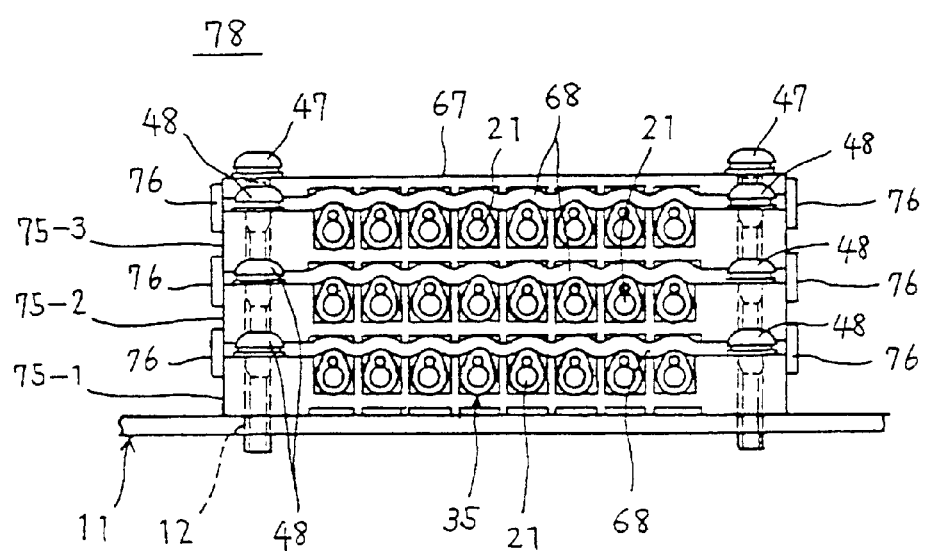
FIG. 20 is a front view of a seventh embodiment of an optical fiber holder of the present invention.

FIG. 20 is a front view of a seventh embodiment of an optical fiber holder of the present invention. In the optical fiber holder 78 of this embodiment, the screws 48 are inserted into the screw insertion holes 37 of a first holder main body 75-1, and are put into the screw holes 12 formed in a predetermined position in the attachment portion of the printed board 11. A plurality of optical fiber connection portions 21 are inserted in the optical fiber accommodating unit 35 of the first holder main body 75-1. The elastic member 68 is placed on the first holder main body 75-1. A second holder main body 75-2 is then placed on the elastic member 68, and is slightly shifted from the elastic member 68. Here, the screw insertion holes 37 of the second holder main body 75-2 is positioned in conformity with the positions of the screw holes 36 of the first holder main body 75-1. The elastic member 68 is interposed in the overlapped region between the first holder main body 75-1 and the second holder main body 75-2.

The screws 48 are then inserted into the screw insertion holes 37 of the second holder main body 75-2, and are put into the screw holes 36 of the first holder main body 75-1, so that the optical fiber connecting portions 21 can be held in the first holder main body 75-1, and that the second holder main body 75-2 can be secured to the first holder main body 75-1. A plurality of optical fiber connecting portions 21 are arranged side by side and inserted in the optical fiber accommodating unit 35 of the second holder main body 75-2. Likewise, a third holder main body 75-3 is then placed on the second holder main body 75-2, with the elastic member 68 being interposed between them. The third holder main body 75-3 is secured by the screws 48. A plurality of optical fiber connection portions 21 are arranged side by side and inserted in the optical fiber accommodating unit 35 of the third holder main body 75-3. The elastic member 68 and the presser member 67 are then secured by putting the screws 47 into the screw holes 36 of the third holder main body 75-3.

A side view of the optical fiber holder 78 is substantially the same as FIG. 17, and all the parts mentioned above, other than the holder main bodies 75-1 to 75-3, are shown in FIG. 17. All the holder main bodies of this embodiment are also of the same type, but the different reference numerals are allocated to them for easier recognition. The other features of this embodiment are the same as the embodiments shown in FIGS. 10 and 16, and the process of holding the optical fiber connection portions 21 is the same as the process shown in FIGS. 11A and 11B. In this embodiment, both side surfaces of the elastic member 68 and the presser member 67 are securely positioned by the protrusions 76 on both sides of the holder main bodies 75-1 to 75-3, so that only a pair of screws 47 are enough to secure the optical fiber holder 78 to the attachment portion of the printed board 11.

Although the elastic member 45, 58, or 68 is disposed on the optical fiber connection portions 21 in the embodiments shown in FIGS. 9 to 20, the same effects can be obtained by disposing an elastic member on each bottom surface of the concave sections 33. However, it should be noted that interposing an elastic member is not necessary as long as the optical fiber connection portions 21 are properly pressed. Still, it is true that better effects can be expected by employing an elastic member. It is also possible to dispose elastic members on both upper surface and lower surface, instead of disposing an elastic member on only one surface.

Figure 21:
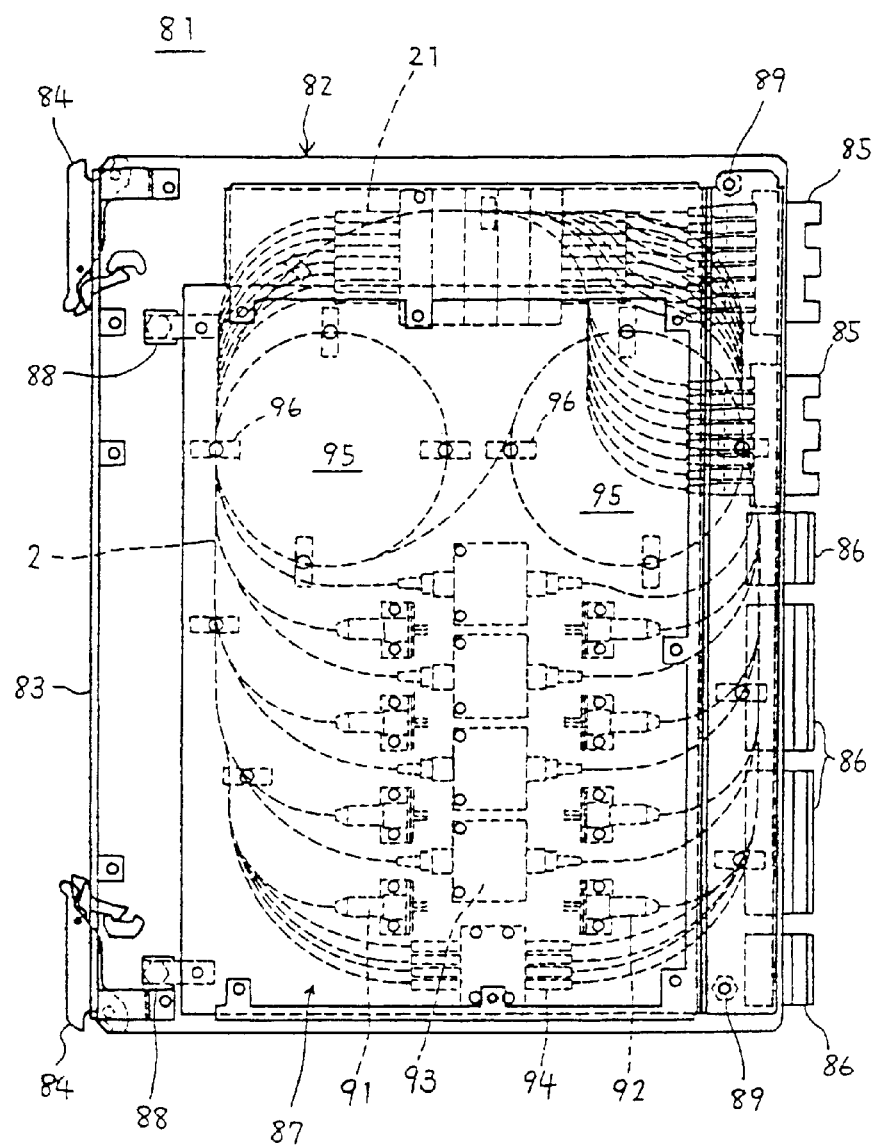
FIG. 21 is a side view of an optical device to which an optical fiber holder of the present invention is applied.

FIG. 21 is a side view of an optical device to which an optical fiber holder of the present invention is applied. In this figure, an optical device 81 is a printed board unit, and is inserted in a housing of an apparatus main body (not shown). The printed board unit is plugged in a printed circuit board which is the backboard of the housing.

More specifically, the optical device 81 has a main printed board 82 and a front board 83, and the main printed board 82 is provided with lever members 84 on its upper side and the lower side. The lever members 84 are used to insert and pull the printed boards unit into and out of the housing. A plurality of optical connectors 85 and electric connectors 86 to be plugged in the connectors on the backboard are formed on the rear surface side (on the right side in the figure).

A sub printed board 87 is arranged in parallel with the main printed board 82 at a predetermined distance. One side of the sub printed board 87 is supported by hinges 88 at the front upper and lower corners. The rear upper and lower corners of the sub printed board 87 are secured by screws 89, and the sub printed board 87 is opened and closed by the hinges 88.

Figure 22:
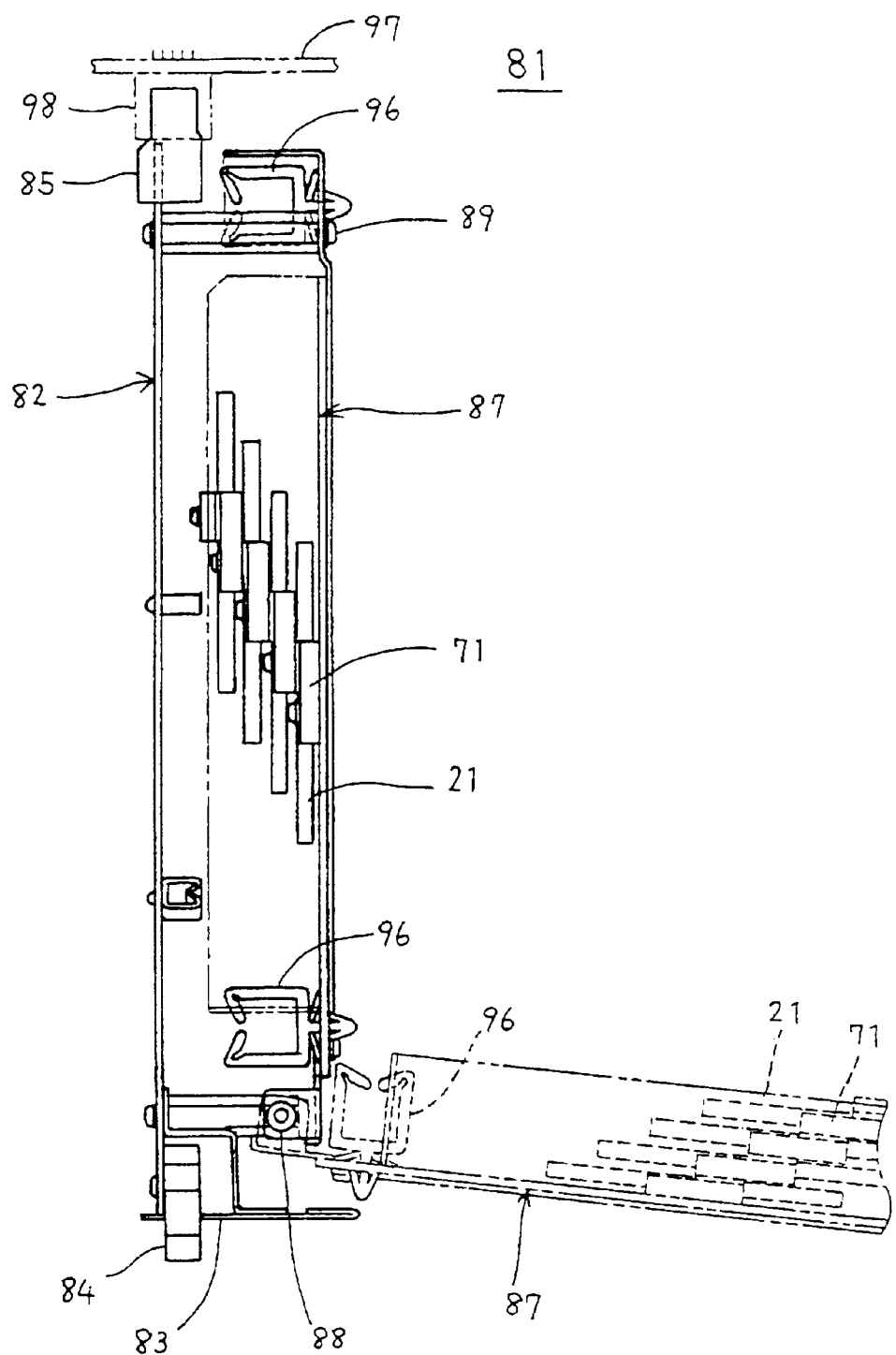
FIG. 22 is a plan view of the optical device shown in FIG. 21.

FIG. 22 is a plan view of the optical device 81 shown in FIG. 21. In this figure, the sub printed board 87 opened rotatively with the hinges 88 as the center is indicated by a two-dot chain line. To avoid unnecessary complexity, other electric components and circuit parts are not shown in this figure.

Electricity-light converters (light emitting elements) 91, light-electricity converters (light receiving elements) 92, attenuators 93 for adjusting the light levels of signals, and optical couplers 94 for light integration and light separation, are orderly arranged on the surface of the sub printed board 87 facing the main printed board 82. These components are all connected by the optical fibers 2. Before the optical fibers 2 reach the optical connectors 85 on the rear side, the extra lengths of the optical fibers 2 are wound around cable holders 96 disposed in extra length accommodating units 95 each having a suitable diameter. The optical fibers 2 between the extra length accommodating units and the optical connectors 85 are then orderly arranged by the optical fiber connection portions 21 (or 1) connected by the splice method, so as not to leave extra lengths.

The optical fiber connection portions 21 are attached to the sub printed board 87. Here, the optical fiber holder 71 shown in FIG. 17 or the optical fiber holder 78 shown in FIG. 20 is employed. The number of optical fibers is variable depending on the situation.

The optical fibers 2 between the optical fiber connection portions 21 and the optical connectors 85 pass through the extra length unit 95 on the side of the hinges 88, which is not affected by the opening and closing of the sub printed board 87. The optical fibers 2 then reach the optical connectors 85.

In FIG. 22, a portion 97 indicated by a two-dot chain line is a part of the backboard of the apparatus main body, and reference numeral 98 indicates connectors on the backboard.

As described so far, in the optical device 81, the paths of the optical fibers 2, the optical connectors, the optical fiber connection portions 21, and other optical components, are all orderly arranged, so that easy workability can be achieved, and that the optical fiber connection portions 21 only require the smallest possible area in the optical device 81. However, it should be noted that the optical device 81 is merely one embodiment, and an optical fiber holder of the present invention can be applied to other embodiments.

Figure 23A:
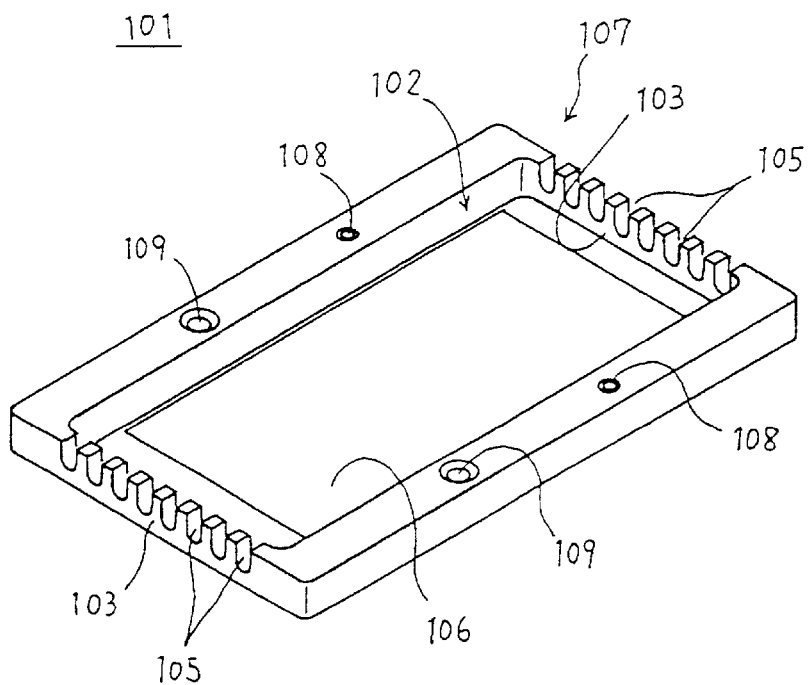
FIG. 23A is a perspective view of a holder main body of an eighth embodiment of an optical fiber holder of the present invention.
Figure 23B:
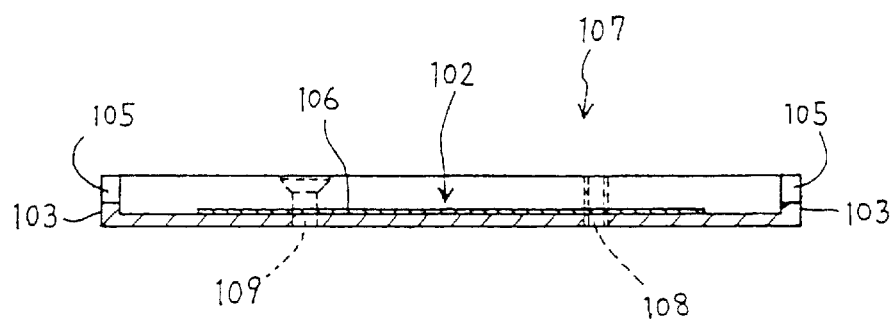
FIG. 23B is a sectional side view of the holder main body shown in FIG. 23A.

FIG. 23A is a perspective view of a holder main body of an eighth embodiment of an optical fiber holder of the present invention, and FIG. 23B is a sectional side view of the holder main body shown in FIG. 23A. The holder main body 101 has a rectangular shape and a concave portion 102 in its center. A plurality of optical fiber guide notches 105 are formed in two side walls 103 facing each other. The optical fiber guide notches 105 on one side are situated in accordance with the positions of the optical fiber guide notches 105 on the other side. The flat bottom surface of the concave portion 102 is an adhesive surface 106. This adhesive surface 106 is formed by applying adhesive directly to the flat bottom surface or by attaching a known sheet provided with an adhesive layer on both sides to the flat bottom surface.

The above optical fiber guide notches 105 and the adhesive surface 106 constitute an optical fiber accommodating unit 107. Two pairs of through holes are formed on both sides of the optical fiber accommodating unit 107. One of the pairs of through holes are screw holes 108, and the other pair are screw insertion holes 109 each having a bowl-like portion.

Figure 1B:
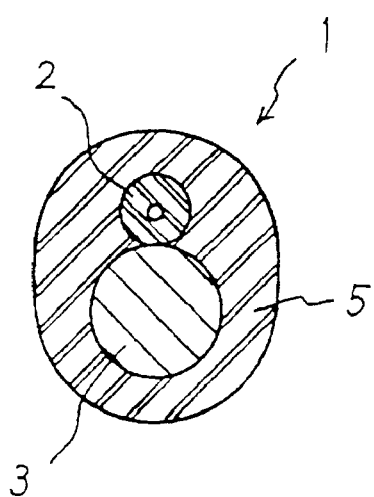
FIG. 1B is a sectional view of the connection portion shown in FIG. 1A.
Figure 2:
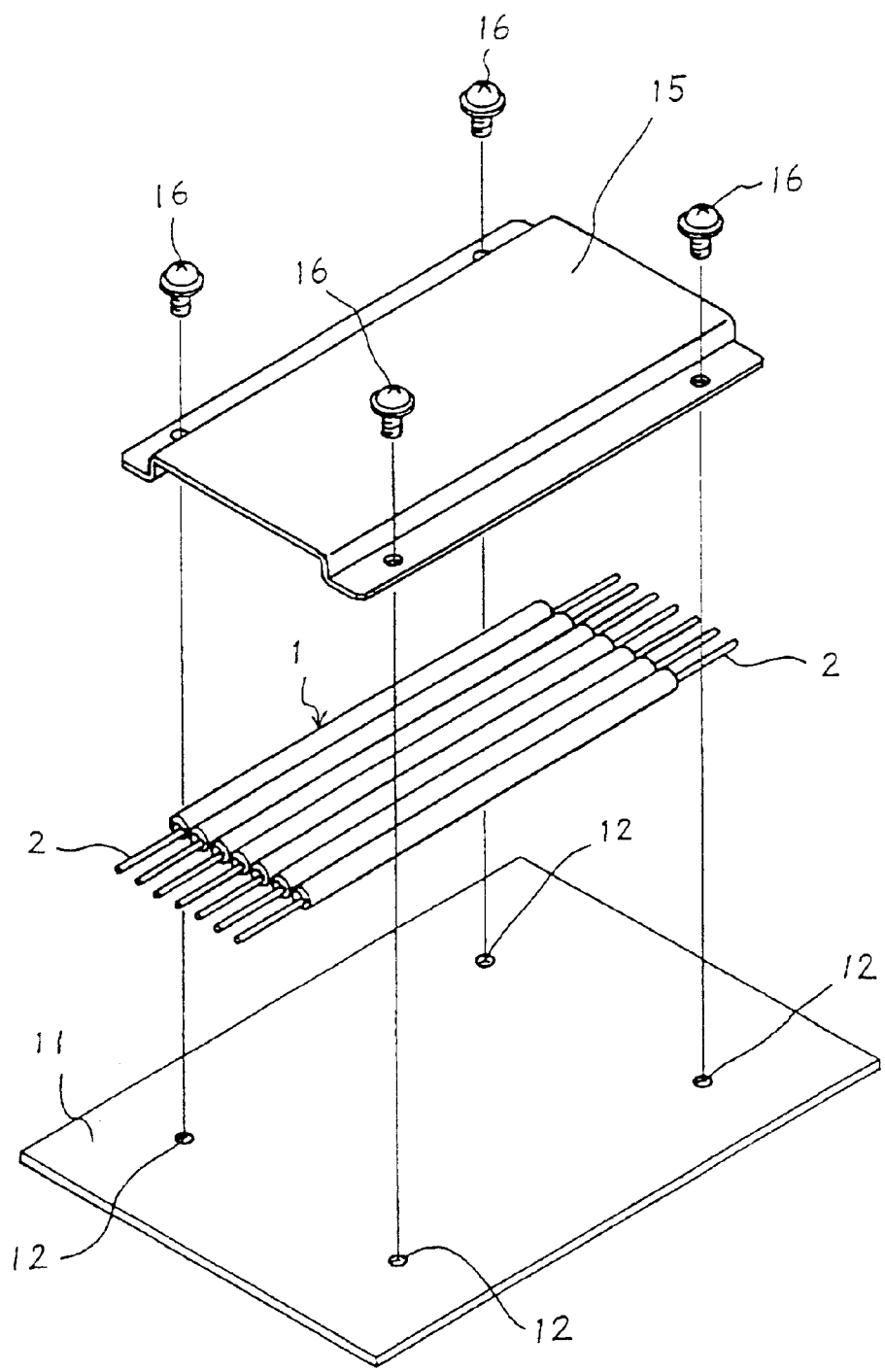
FIG. 2 is an exploded view of an optical fiber holder of the prior art.
Figure 3:
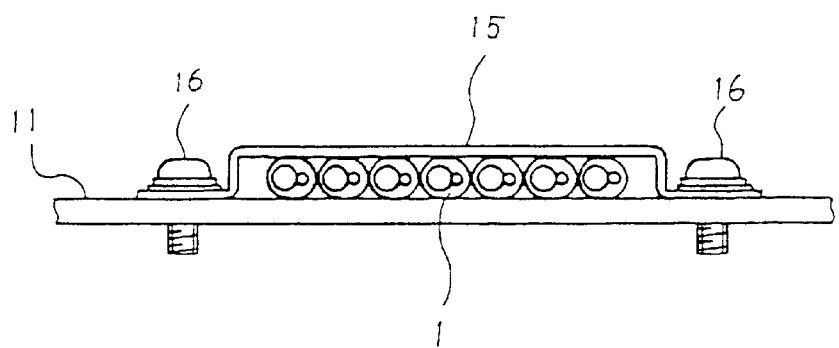
FIG. 3 is a front view of the optical fiber holder of the prior art.
Figure 4:
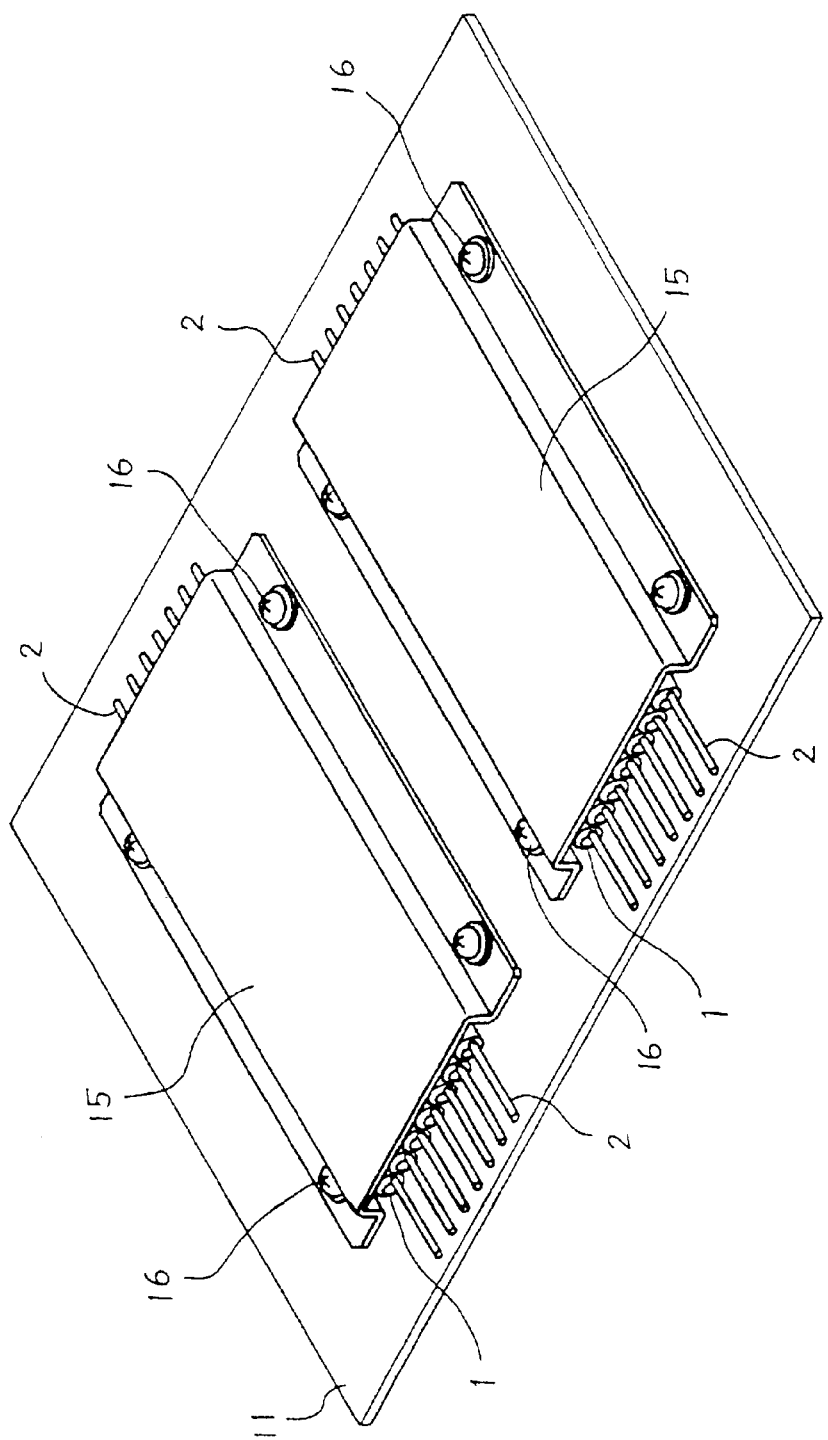
FIG. 4 shows the arrangement of optical fiber holders of the prior art.

The optical fiber connection portions 1 shown in FIGS. 1A and 1B or the optical fiber connection portions 21 shown in FIGS. 5A and 5B are inserted in the optical fiber accommodating unit 107. The optical fiber guide notches 105 in the side walls 103 facing each other are situated so that the optical fibers 2 can be orderly arranged side by side. The holder main body 101 can be integrally molded from light alloy such as aluminum, or synthetic resin such as ABS for its high mechanical strength and excellent dimensional stability.

Figure 24:
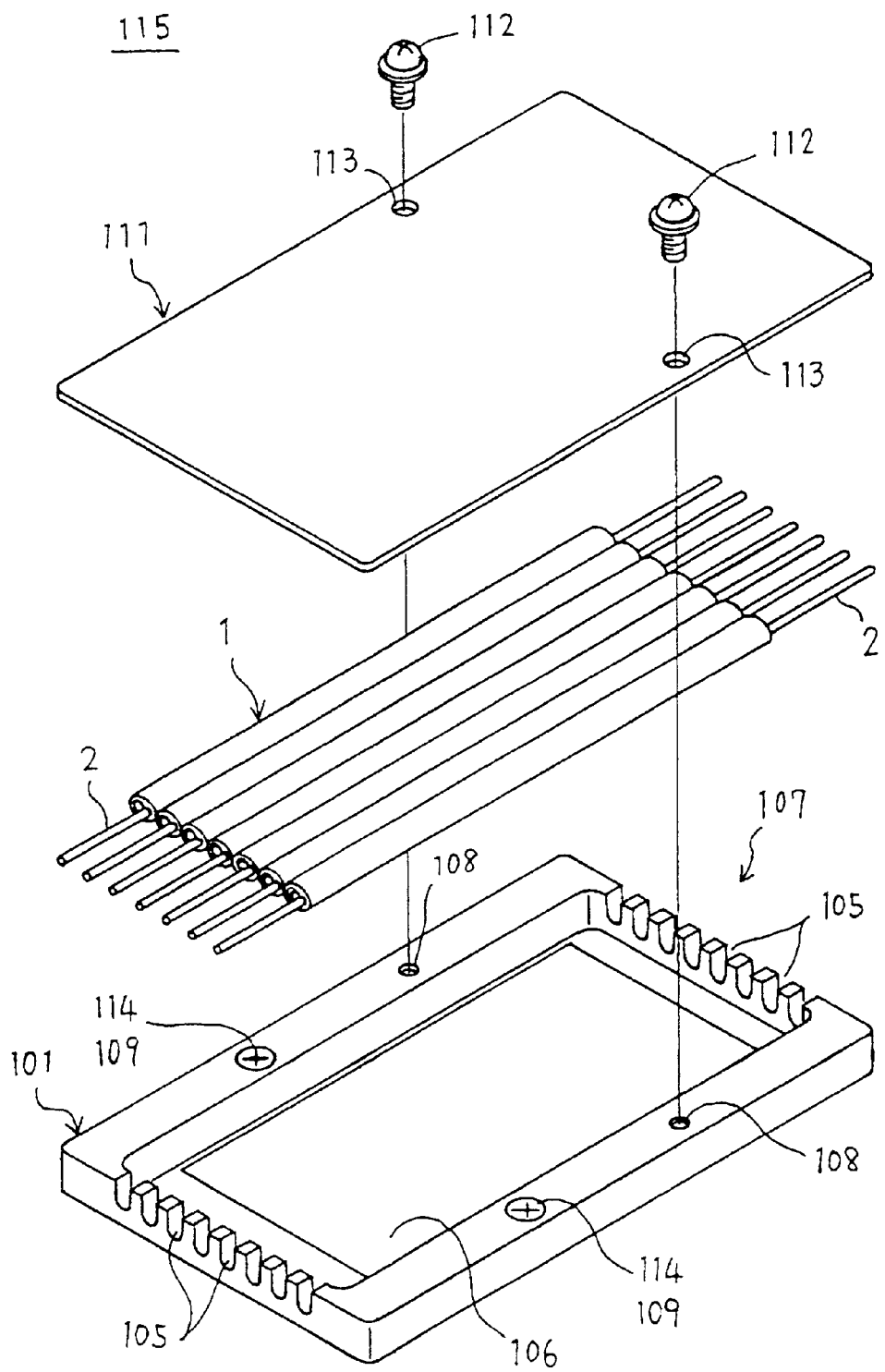
FIG. 24 is an exploded view of the eighth embodiment of an optical fiber holder of the present invention.

FIG. 24 is an exploded view of the eighth embodiment of an optical fiber holder of the present invention. In this figure, the optical fiber connection portions 1 are arranged side by side on ht holder main body 101, and a plate-like presser member 111 and a pair of screws 112 are placed on the optical fiber connection portions 1. The presser member 111 is big enough to cover the entire holder main body 101, and has a pair of screw insertion holes 113 corresponding to the screw holes 108 of the holder main body 101. The presser member 111 is made from a metal plate such as an aluminum alloy plate or stainless steel plate, or a synthetic resin plate. The screws 112 are inserted into the screw insertion holes 1131.

In this embodiment as well as the following embodiments, the optical fiber connection portions 1 shown in FIGS. 1A and 1B are employed, but it should be understood that the optical fiber connection portions 21 shown in FIGS. 5A and 5B can also be employed.

Figure 25:
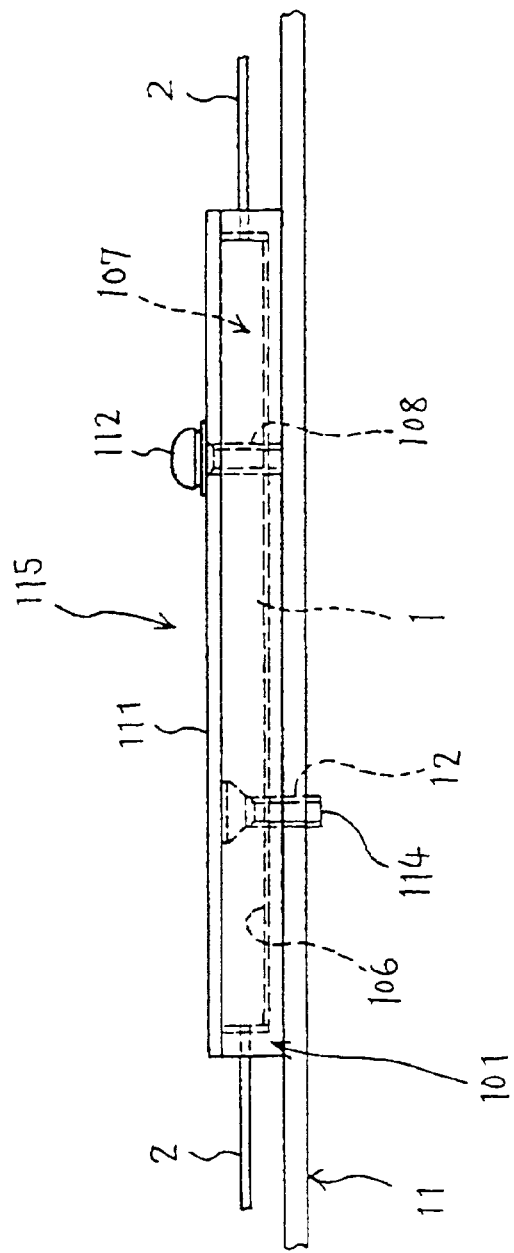
FIG. 25 is a side view of the eighth embodiment of an optical fiber holder of the present invention.

As shown in FIGS. 24 and 25, flat head screws 114 are put into the screw insertion holes 109, and are then secured to the screw holes 12 in the predetermined positions of the attachment portion, for instance, of the printed board 11. The optical fiber connection portions 1 are inserted in the optical fiber accommodating unit 10, and the optical fibers 2 on both sides of the optical fiber connection portions 1 are inserted in the optical fiber guide notches 105. Here, the optical fiber connection portions 1 are brought into contact with the adhesive surface 106 and are thus secured to the adhesive surface 106. The optical fiber connection portions 1 are also secured in the longitudinal direction, because the side walls 103 restrict their movement in that direction. The optical fiber 2 are engaged with the optical fiber guide notches 105, thereby further securing the optical fiber connection portions 1 in the horizontal direction. The optical fiber connection portions 1 can also be secured in the optimum state in the axial direction, because they adhere to the adhesive surface 106. Thus, the optical fiber connection portions 1 can be securely positioned in the longitudinal direction, the horizontal direction, and the axial direction.

The presser member 111 attached to the holder main body 101 by the screws 112 also serves prevent the optical fiber connection portions 1 from being subjected to unprepared operations or external shock. The presser member 111 also protects the optical fibers 2 from being pulled out.

Figure 26A:
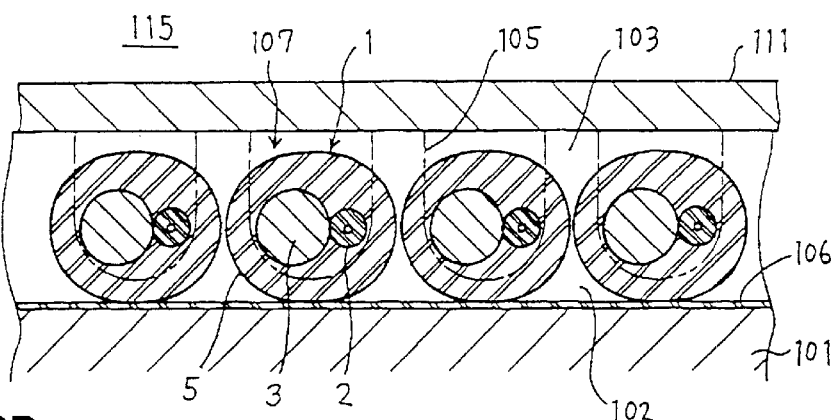
FIGS. 26A to 26C illustrate a holding state in an optical fiber holder of the present invention.
Figure 26B:
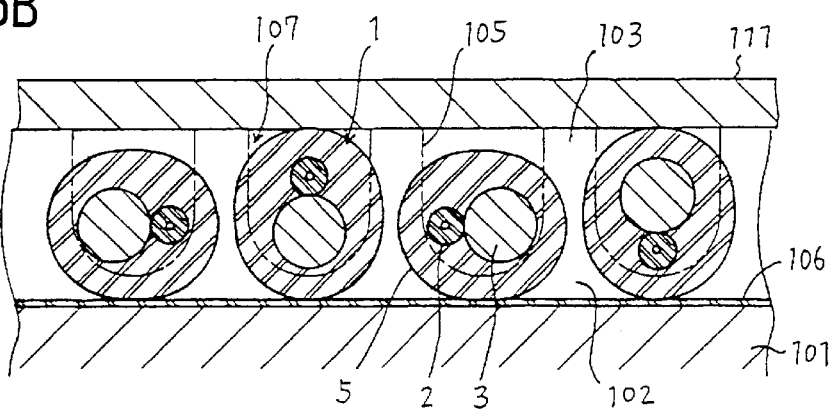
Figure 26C:
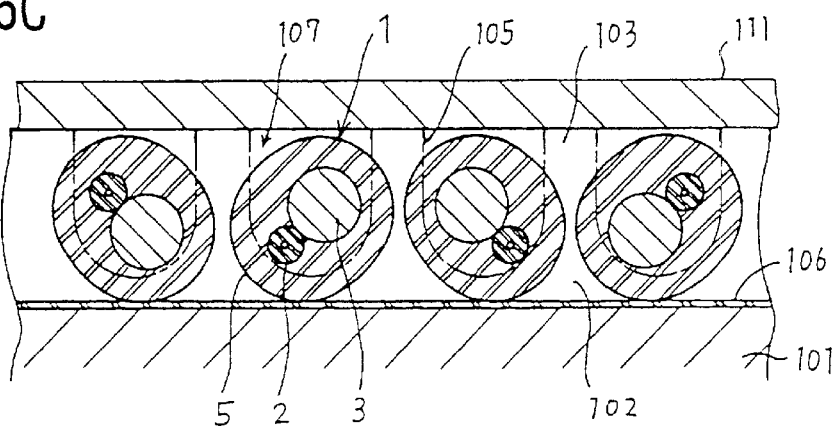

FIGS. 26A to 26C are enlarged sectional views of the optical fiber connection portions 1 held by the optical fiber holder 115 shown in FIG. 22.

FIG. 26A illustrates a case where the optical fiber connection portions 1 accommodated in the optical fiber accommodating unit 107 are situated in the same axial direction. More specifically, the optical fibers 2 are horizontally adjacent to the metal wires 3 in the figure, and a long side of the coating 5 having an elliptical outer shape is positioned in contact with the adhesive surface 106. The optical fiber guide notches 105 indicated by two-dot lines guides the optical fibers 2. The optical fiber connection portions 1 are not in contact with the presser member 111.

FIG. 26B illustrates a case where the optical fiber connection portions 1 are all facing in different directions by 90 degrees in the axis direction. More specifically, the optical fibers 2 are situated both horizontally and vertically adjacent to the metal wires 3 in the optical fiber connection portions 1. Long sides of the coatings 5 of some of the optical fiber connection portions 1 and short sides of the coatings 5 of the rest of the optical fiber connection portions 1 are secured in contact with the adhesive surface 106. The optical fiber connection portions 1 whose long sides are in contact with the adhesive surface 106 are not in contact with the presser member 111, while the optical fiber connection portions 1 whose short sides are in contact with the adhesive surface 106 are in contact with the presser member 111. The contact between the optical fiber connection portions 1 and the presser member 111 is controlled not to subject the optical fibers 2 to a too large pressing force.

FIG. 26C illustrates a case where the optical fibers 2 are all situated diagonally to the metal wires 3 in the optical fiber connection portions 1 accommodated in the optical fiber accommodating unit 107. More specifically, the intermediate position between the a long side and a short side of each coating 5 is secured in contact with the adhesive surface 106, and all the optical fiber connection portions 1 are almost in contact with the presser member 111.

As described above, the optical fiber holder 115 does not possess the walls 32 defining the section 33 as in the optical fiber holder 51 shown in FIGS. 11A and 11B. As a result, the positions of the optical fiber connection portions 1 accommodated in the optical fiber accommodating unit 107 are not restricted in the radial direction, and have some allowance in the horizontal direction. Therefore, the optical fiber connection portions 1 are brought into contact with the adhesive surface 106, and are thus positioned.

The widths of the optical fiber guide notches 105 are set so that each of the optical fibers 2 is allowed to have an extra space in the horizontal direction. Thus, the optical fiber connection portions 1 can be accommodated in the optical fiber accommodating unit 107 in various states in the axial direction, and the intervals of the connection portions 1 can be varied depending on the adhering position.

Figure 27:
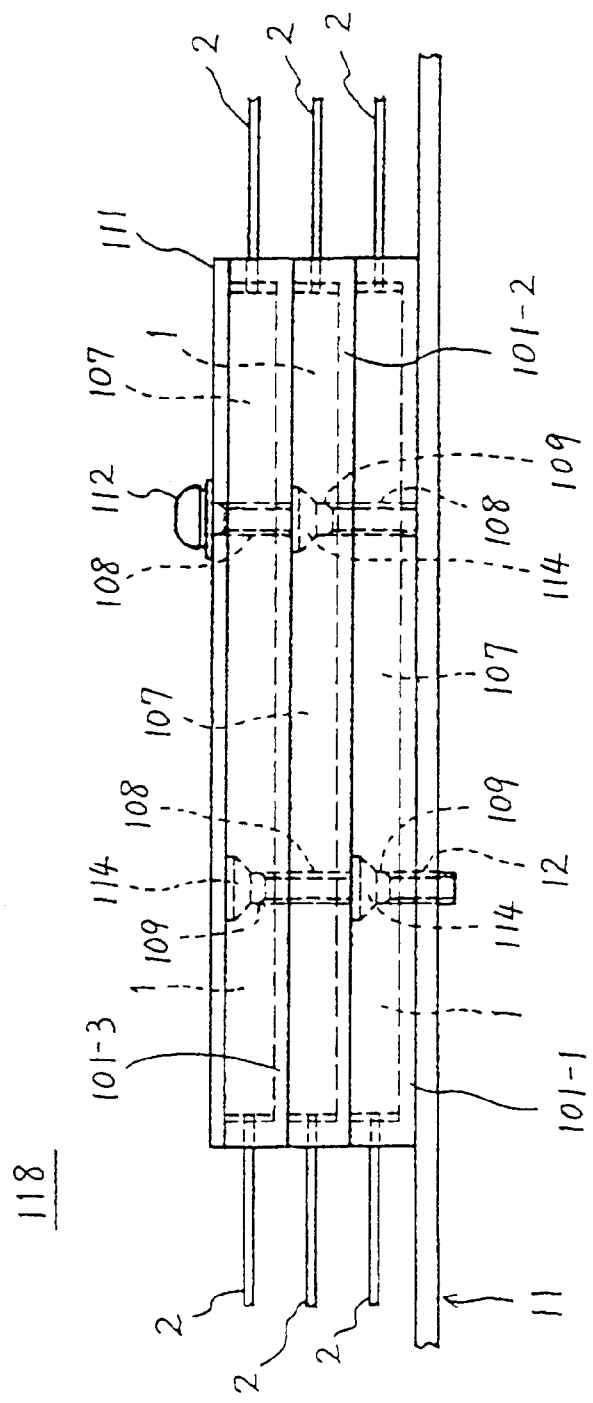
FIG. 27 is a side view of a ninth embodiment of an optical fiber holder of the present invention.

FIG. 27 is a side view of a ninth embodiment of an optical fiber holder of the present invention. In the optical fiber holder 118, the flat head screws 114 are inserted into the screw insertion holes 109 of the holder main body 101 shown in FIGS. 23A and 23B (referred to as a first holder main body 101-1 in this embodiment). The flat head screws 114 are then put in the screw holes 12 formed in the predetermined positions on the printed board 11, thereby attaching the first holder main body 101-1 to the printed board 11. A plurality of optical fiber connection portions 1 are arranged and inserted in the optical fiber accommodating unit 107 of the first holder main body 101-1.

A second holder main body 101-2 is placed on the first holder main body 101-1. Here, the second holder main body 101-2 is positioned in the opposite direction to the first holder main body 101-1, so that the screw insertion holes 109 of the second holder main body 101-2 can be positioned directly above the screw holes 108 of the first holder main body 101-1. The flat head screws 114 are then inserted into the screw insertion holes 109 of the second holder main body 101-2, and are put into the screw holes 108 of the first holder main body 101-1. Thus, the second holder main body 101-2 is secured to the first holder main body 101-1, while covering the optical fiber connection portions 1 of the first holder main body 101-1.

A plurality of optical fiber connection portions 1 are then arranged side by side and inserted in the optical fiber accommodating unit 107 of the second holder main body 101-2. A third holder main body 101-3 is then placed on the second holder main body 101-2. Here, the third holder main body 101-3 is positioned in the opposite direction to the second holder main body 101-2. The flat head screws 114 then secures the third holder main body 101-3 to the second holder main body 101-2.

Likewise, a plurality of optical fiber connection portions 1 are arranged side by side and inserted in the optical fiber accommodating unit 107 of the third holder main body 101-3. As shown in FIG. 27, the presser member is secured to the third holder main body 101-3 by putting screws 112 into the screw holes 108 of the third holder main body 101-3.

Figure 28:
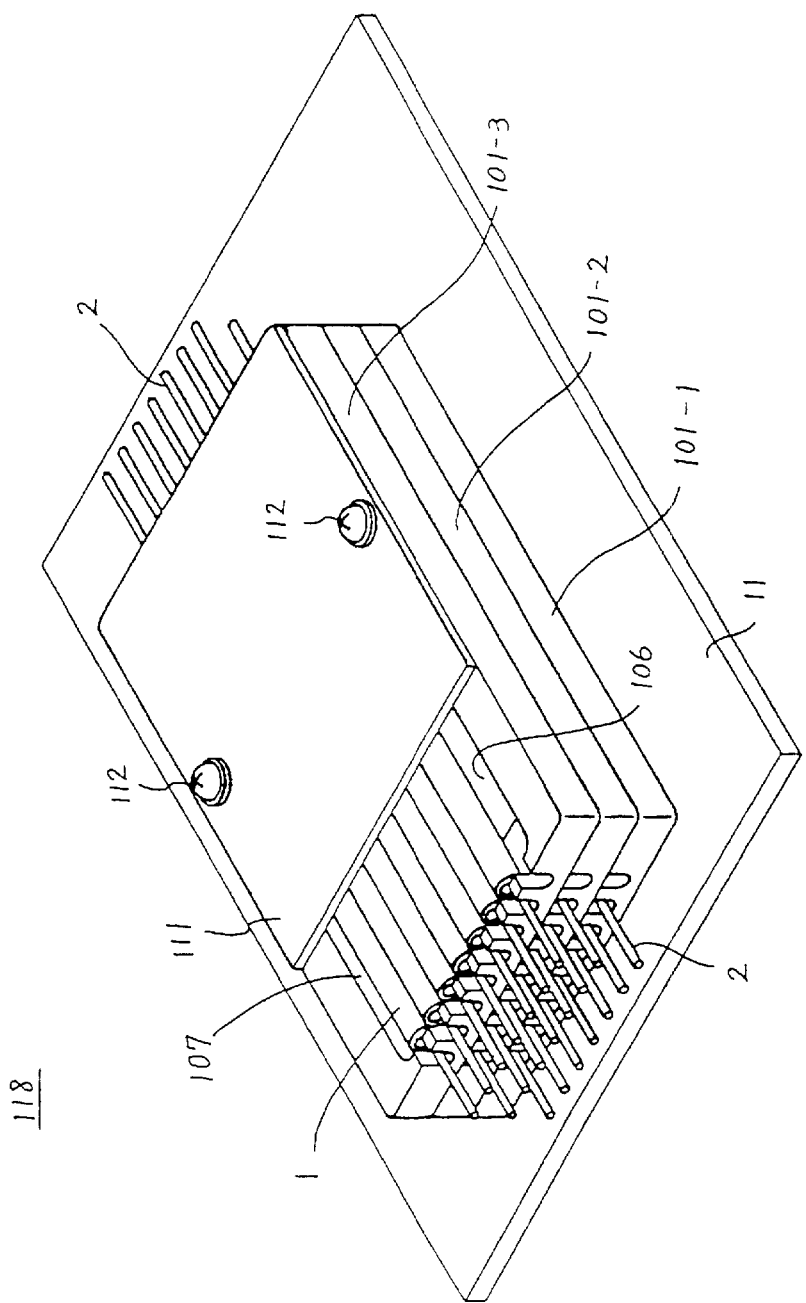
FIG. 28 is a perspective view of the ninth embodiment of an optical fiber holder of the present invention.

FIG. 28 is a perspective view of the optical fiber holder 118 in the assembled state. In this embodiment, the three holder main bodies 101-1 to 101-3 are laminated on one another. Accordingly, the number of optical fiber connection portions 1 orderly arranged and accommodated can be made three times larger in the same area. It should be noted here that in FIG. 28, the presser member 111 is partially removed for ease of recognition of the arranged state of the optical fiber connection portions 1.

The three holder main bodies in this embodiment are of the same type, but are indicated by different reference numerals 101-1, 101-2, and 101-3 for easier recognition. Also, the number of the holder main bodies is not limited to three.

Figure 29:
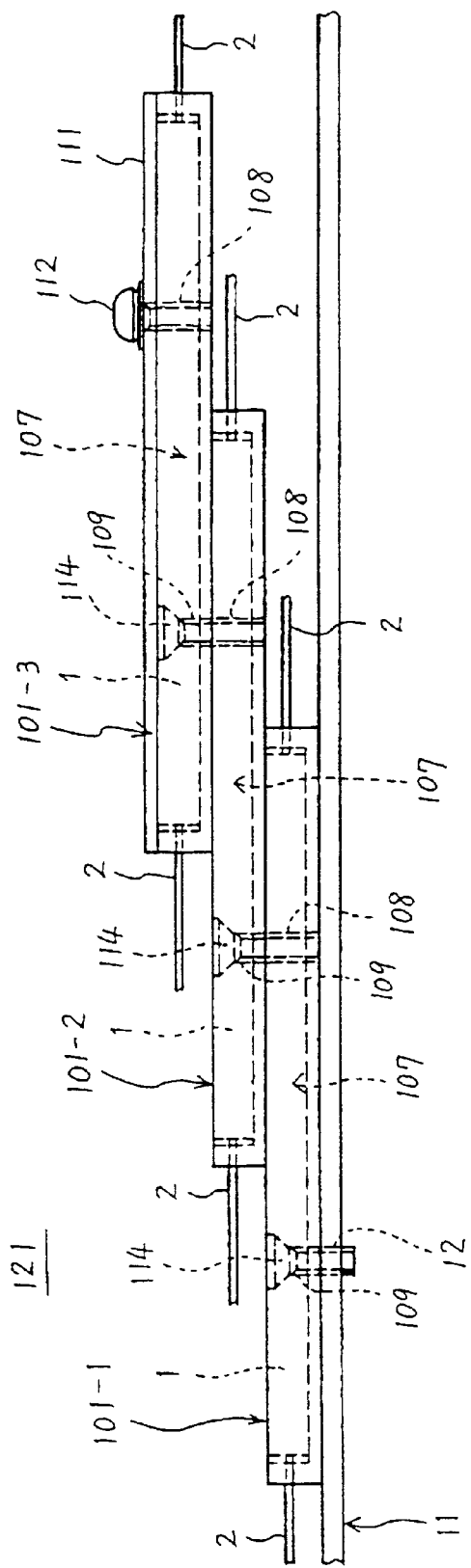
FIG. 29 is a side view of a tenth embodiment of an optical fiber holder of the present invention.

FIG. 29 is a side view of a tenth embodiment of an optical fiber holder of the present invention. In an optical fiber holder 121 of this embodiment, the flat head screws 114 are inserted into the screw holes 12 formed in the predetermined positions in the attachment portion of the printed board 11 via the insertion screw holes 109 of the first holder main body 101-1, thereby securing the first holder main body 101-1 to the attachment portion of the printed board 11. A plurality of optical fiber connection portions 1 are inserted in the optical fiber accommodating unit 107 of the first holder main body 101-1 in the same manner as in the foregoing embodiments.

A second holder main body 101-2 is then placed on the first holder main body 101-1. As shown in FIG. 29, the second holder main body 101-2 is slightly shifted to the right from the first holder main body 101-1, so that the screw insertion holes 109 of the second holder main body 101-2 can be positioned directly over the screw holes 108 of the first holder main body 101-1. The flat head screws 114 are inserted into the screw holes 108 of the first holder main body 101-1 through the screw insertion holes 109 of the second holder main body 101-2. Thus, the second holder main body 101-2 covers the optical fiber connection portions 1 accommodated in the optical fiber accommodating unit 107 of the first holder main body 101-1, and also is secured to the first holder main body 101-1.

A plurality of optical fiber connection portions 1 are then arranged side by side and inserted in the optical fiber accommodating unit 107 of the second holder main body 101-2. A third holder main body 101-3 is placed on the second holder main body 101-2, and is secured by the flat head screws 114.

Likewise, a plurality of optical fiber connection portions 1 are arranged side by side and inserted in the optical fiber accommodating unit 107 of the third holder main body 101-3. As shown in FIG. 29, the presser member 111 is then secured to the third holder main body 101-3 by putting the screws 112 into the screw holes 108.

In this embodiment, the three holder main bodies are laminated, and the number of optical fiber connection portions 1 held in an attachment portion is three times larger than in a case of a single holder main body attached to an attachment portion having the same width.

This embodiment is characterized by securing the holder main bodies one by one, and handling the flat head screws 114 in separate pairs. For instance, by loosening the flat head screws 114 of the third holder main body 101-3, the third holder main body 101-3 can be detached from the second holder main body 101-2 so as to remove the optical fiber connection portions 1 held in the optical fiber accommodating unit 107 of the second holder main body 101-2. In such a case, an escape holes for allowing the handling of the flat head screws 114 should be formed in the presser member 111 in advance. When removing the optical fiber connection portions 1 held in the third holder main body 101-3, it is necessary to remove the presser member 111. This can be carried out while he optical fiber connection portions 1 in the other holder main bodies can remain held, In this embodiment, the three holder main bodies are of the same type, but are indicated by different reference numerals 101-1, 110-2, and 101-3 for easier recognition. Also, the number of holder main bodies is not limited to three.

Figure 30A:
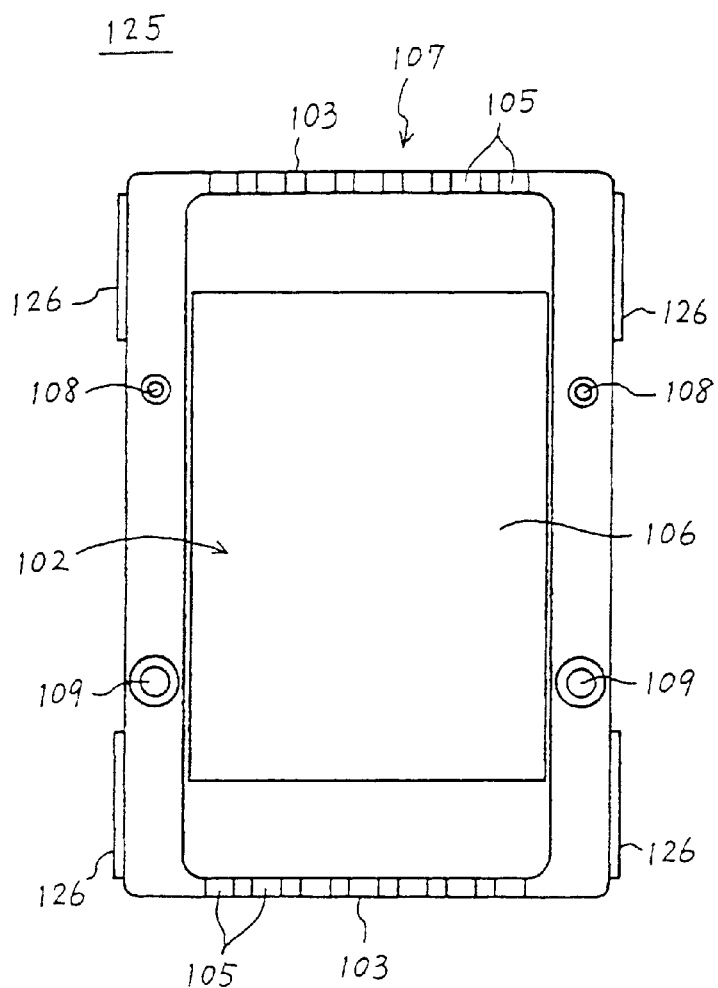
FIG. 30A is a plan view of a holder main body of an eleventh embodiment of an optical fiber holder of the present invention.
Figure 30B:
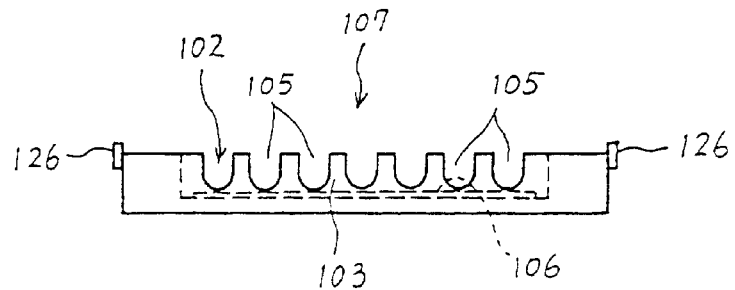
FIG. 30B is a front view of the holder main body shown in FIG. 30A.

FIG. 30A is a plan view of a holder main body of an eleventh embodiment of an optical fiber holder of the present invention, and FIG. 30B is a front view of the holder main body. The holder main body 125 of this embodiment has a rectangular concave portion 102 in the center. A plurality of optical fiber guide notches 105 are formed in two side walls 103 facing each other. The optical fiber guide notches 105 on one side are situated in accordance with the positions of the optical fiber guide notches 105 on the other side. The flat bottom surface of the concave portion 102 is an adhesive surface 106. This adhesive surface 106 is formed by applying adhesive directly to the flat bottom surface or by attaching a known sheet provided with an adhesive layer on both sides to the flat bottom surface.

The above optical fiber guide notches 105 and the adhesive surface 106 constitute an optical fiber accommodating unit 107. Two pairs of through holes are formed on both sides of the optical fiber accommodating unit 107. One of the pairs of through holes are screw holes 108, and the other pair are screw insertion holes 109 each having a bowl-like portion.

The optical fiber connection portions 1 shown in FIGS. 1A and 1B or the optical fiber connection portions 21 shown in FIGS. 5A and 5B are inserted in the optical fiber accommodating unit 107. The optical fiber guide notches 105 in the side walls 103 facing each other are situated so that the optical fibers 2 can be orderly arranged side by side.

The structure described above is substantially the same as the eighth embodiment shown in FIGS. 23A and 23B. The holder main body 125 of the present invention is characterized by protrusions 126 extending higher than the upper surface of the optical fiber accommodating unit 107. The protrusions 126 integrally formed on both side surfaces of the holder main body 125.

The holder main body 125 can also be integrally molded from light alloy such as aluminum, or from synthetic resin.

Figure 31:
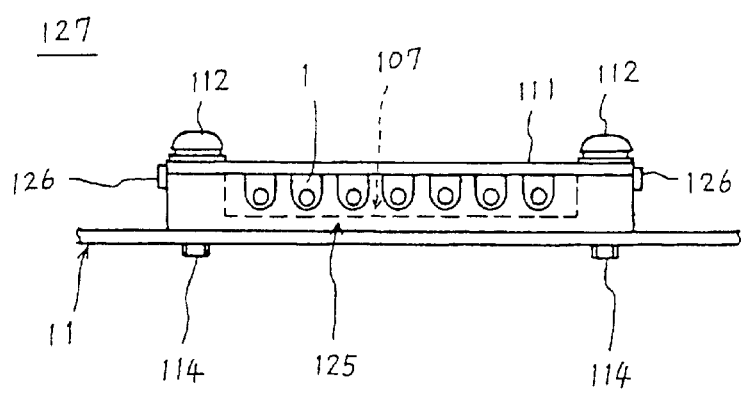
FIG. 31 is a front view of the eleventh embodiment of an optical fiber holder of the present invention.

FIG. 31 is a front view of the eleventh embodiment of an optical fiber holder of the present invention. In the optical fiber holder 127 of this embodiment, the optical fiber connection portions 1 are arranged and inserted in the optical fiber accommodating unit 107 of the holder main body 125 secured to the attachment portion of the printed board 11 by the flat head screws 114. The presser member 111 is placed thereon and secured to the holder main body 125 by the screws 112.

The above structure is substantially the same as the eighth embodiment shown in FIGS. 24 and 25, and the optical fiber connection portions 1 are held in the same manner as shown in FIGS. 26A to 26C. In this embodiment, the side surfaces of the presser member 111 is securely positioned by the protrusions 126, so that the presser member 111 can be prevented from shifting or deviating from the attachment position. Accordingly, only a pair of screws 112 are enough to secure the presser member 111.

Figure 32:
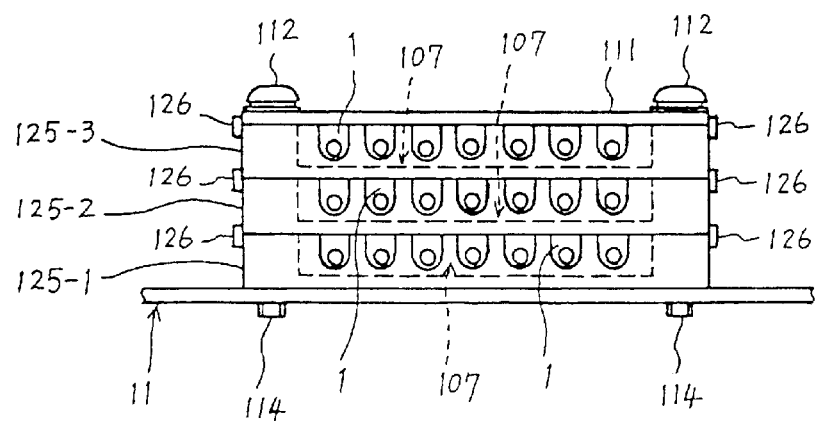
FIG. 32 is a front view of a twelfth embodiment of an optical fiber holder of the present invention.

FIG. 32 is a front view of a twelfth embodiment of an optical fiber holder of the present invention. In the optical fiber holder 128 of this embodiment, a first holder main body 125-1 is attached to the attachment portion of a printed board 11 by the flat head screws 114, and a plurality of optical fiber connection portions 1 are inserted in the optical fiber accommodating unit 107 of the first holder main body 125-1.

A second holder main body 125-2 is then placed on the first holder main body 125-1. Here, the screw insertion holes 109 of the second holder main body 125-2 should be positioned directly on the screw holes 108 of the first holder main body 125-1. The flat head screws 114 are put into the screw holes 108 of the first holder main body 125-1 via the screw insertion holes 109 of the second holder main body 125-2, so that the second holder main body 125-2 covers the optical fiber connection portions 1 accommodated in the optical fiber accommodating unit 107 of the first holder main body 125-1, and also is secured to the first holder main body 125-1.

A plurality of optical fiber connection portions 1 are then arranged side by side and inserted in the optical fiber accommodating unit 107 of the second holder main body 125-2. A third holder main body 125-3 is placed thereon and secured to the second holder main body 125-2 by the flat head screws 114.

Likewise, a plurality of optical fiber connection portions 1 are arranged side by side and inserted in the optical fiber accommodating unit 107 of the third holder main body 125-3. The presser member 111 is placed thereon and secured to the third holder main body 125-3 by putting the screws 112 into the screw holes 108 of the third holder main body 125-3.

A side view of such an optical fiber holder is substantially the same as the side view shown in FIG. 27 or the side view shown in FIG. 29. The three holder main bodies of this embodiment are of the same type, but are indicated by different reference numerals 125-1, 125-2, and 125-3 for easier recognition. The optical fiber connection portions 1 are held in the same manner as shown in FIGS. 26A to 26C.

In this embodiment, the protrusions 126 formed on the side surfaces of the holder main bodies prevent the respective laminated (or stepwise-laminated) holder main bodies from shifting or deviating, through the holder main bodes are secured only by the flat head screws 114.

Figure 33A:
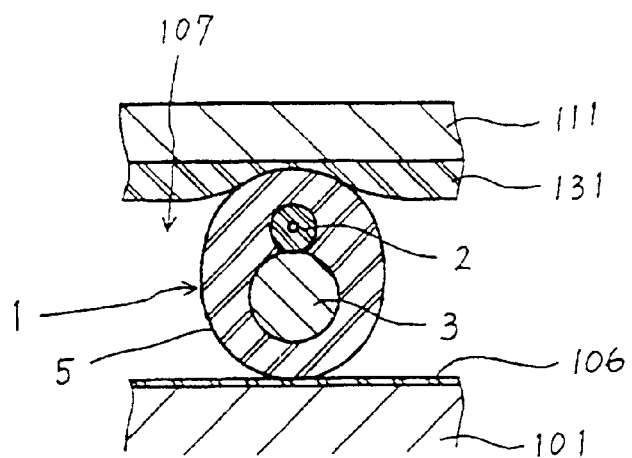
FIG. 33A shows a modification suitable for an optical fiber holder of the present invention.
Figure 33B:
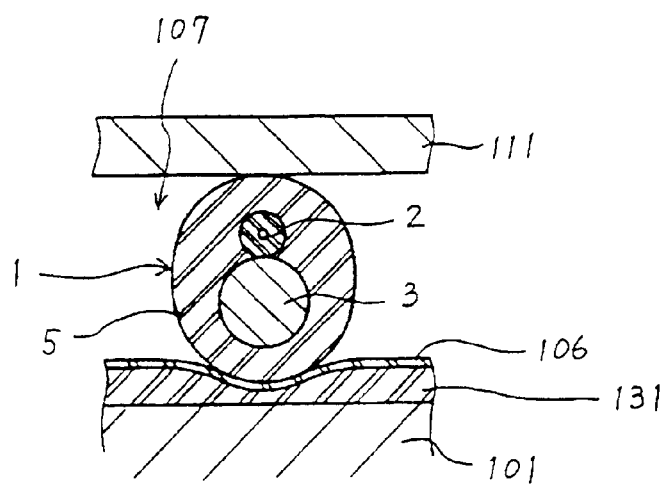
FIG. 33B shows another modification suitable for an optical fiber holder of the present invention.

FIGS. 33A and 33B illustrate modifications applicable to an optical fiber holder of the present invention. FIG. 33A shows a sheet-like elastic member made of flexible synthetic rubber or sponge-like rubber. As shown in the figure, this elastic member 131 is interposed between the presser member 111 and the optical fiber connection portions 1, or is attached to the lower surface of the presser member 111. By doing so, the optical fiber connection portions 1 can be pressed and secured in the orderly arranged state. Also, the optical fibers 2 can be prevented from being subjected to a too large pressing force, i.e., the light transmission characteristics of the optical fibers 2 will not be adversely affected. Here, it is essential to control the pressing force to keep the elastic member 131 in a suitably deformed state without compressing it too hard.

The above elastic member 131 is also applicable in a case where a plurality of holder main bodies are laminated. In such a case, the elastic member 131 is not only disposed under the presser member 111, but also under the holder main bodies except the lowermost holder main body.

FIG. 33B shows the elastic member 131 disposed under the adhesive surface 106 that is the bottom surface of the optical fiber accommodating unit 107. In such a case, the elastic member 131 is maintained in a suitably deformed state and in a lightly compressed state. Thus, the optical fiber connection portions 1 can be pressed and secured in the arranged state, and the optical fibers 2 can be prevented from being subjected to a too large pressing force, thereby maintaining excellent light transmission characteristics.

It should be noted that the above elastic member 131 can be disposed under both the presser member 111 and the adhesive surface 106.

Each of the optical fiber connection portions described in the embodiments of the present invention is a splice connection portion between a pair of optical fibers, but the present invention is also applicable to a connection portion of a plurality of optical fibers, such as an optical coupler for integrating and synthesizing optical signals from the plurality of optical fibers, and for branching optical signals into the plurality of optical fibers.

The present invention is not limited to the specifically disclosed embodiments, but variations and modifications may be made without departing from the scope of the present invention.

The present application is based on Japanese priority application No. 10-247383, filed on Sep. 1, 1998, the entire contents of which are hereby incorporated by reference.

What is claimed is:

1. An optical fiber holder comprising:
   a holder body including an optical fiber accommodating unit having recess portions defined by first protrusions arranged side by side, coated connection portions of optical fibers being respectively accommodated in the recess portions;
   a presser member attached to the holder body, said presser member having second protrusions opposite the first protrusions, shorter than the first protrusions, and covering the coated connection portions of the optical fibers; and
   an elastic member interposed between the coated connection portions of the optical fibers and the presser member.

2. An optical fiber holder comprising
   a holder body which includes:
   an optical fiber accommodating unit having recess portions defined by first protrusions arranged side by side, coated connection portions of optical-fibers being respectively accommodated in the recess portions;
   second protrusions on the rear surface of the optical fiber accommodating unit, said second protrusions opposite the first protrusions and being shorter than the first protrusions; and
   an elastic member interposed between the coated connection portions of the optical-fibers and the second protrusions.

3. An optical fiber holder comprising
   a holder body which has first and second side surfaces and an upper surface, and includes:
   an optical fiber accommodating unit having recess portions defined by first protrusions arranged side by side and extending towards the upper surface of the holder body, coated connection portions of optical fibers being respectively accommodated in the recess portions;
   a plurality of attachment holes are respectively formed on both sides of the optical fiber accommodating unit, said plurality of attachment holes including both screw holes and screw insertion through holes;
   an elastic member disposed on the coated connection portions of the optical fibers; and
   third protrusions provided on the first and second side surfaces of the holder body and extending above the upper surface of the holder body.

4. The optical fiber holder as claimed in claim 1, further comprising:
   third protrusions extending above the upper surface of the holder body are formed on both side surfaces of the holder body.

5. The optical fiber holder as claimed in claim 2, further comprising:
   third protrusions extending above the upper surface of the holder body are formed on both side surfaces of the holder body.

6. An optical fiber holder comprising:
   a plurality of holder bodies each including an optical fiber accommodating unit having recess portions defined by first protrusions arranged side by side, coated connection portions of optical fibers being respectively accommodated in the recess portions, said plurality of holder bodies being laminated on one another;
   a presser member attached to an uppermost one of the holder bodies, said presser member having second protrusions opposite the first protrusions and shorter than the first protrusions and covering the coated connection portions of the optical fibers;
   a plurality of attachment holes respectively formed on both sides of the optical fiber accommodating unit, said plurality of attachment holes including both screw holes and screw insertion through holes; and
   an elastic member interposed between the coated connection portions of the optical fibers and the second protrusions,
   wherein the coated connection portions of optical fibers are accommodated by the recess portions of each lower one of the holder bodies and protrusions on the rear surface of each corresponding upper one of the holder bodies.

7. An optical fiber holder comprising
   a plurality of holder bodies laminated on one another, said holder bodies each including:
   an optical fiber accommodating unit having recess portions defined by first protrusions arranged side by side, coated connection portions of optical fibers being respectively accommodated in the recess portions;
   second protrusions on the rear surface of the optical fiber accommodating unit, said second protrusions opposite the first protrusions, and being shorter than the first protrusions; and
   an elastic member interposed between the coated connection portions of the optical fibers and the second protrusions,
   wherein the coated connection portions of optical fibers are accommodated by the recess portions-of each lower one of the holder bodies and protrusions on the rear surface of each corresponding upper one of the holder bodies.

8. An optical fiber holder comprising:
   a plurality of holder bodies laminated on one another, said holder bodies each including:
   an optical fiber accommodating unit having recess portions defined by first protrusions arranged side by side on an upper surface thereof, second protrusions arranged side by side on a lower surface thereof, and third protrusions extending above a side surface thereof, coated connection portions of optical fibers being respectively accommodated in the recess portions;
   a plurality of attachment holes are respectively formed on both sides of the optical fiber accommodating unit, said plurality of attachment holes including both screw holes and screw insertion through holes; and
   an elastic member disposed on the coated connection portions of the optical fibers, wherein the coated connection portions of optical fibers are accommodated by the recess portions of each lower one of the holder bodies and the second protrusions on the lower surface of each corresponding upper one of the holder bodies.

9. The optical fiber holder as claimed in claim 8, wherein:
coupling screws are put into the screw holes of each lower one of the holder bodies via the screw insertion through holes of each corresponding upper one of the holder bodies.

10. An optical fiber holder comprising:
a holder body which has an upper surface and includes:
   an optical fiber guide, notches being formed thereon at uniform intervals in side walls facing each other;
   an optical fiber accommodating unit having an inner flat surface which is an adhesive surface for positioning coated connection portions of optical fibers accommodated therein;
   a plurality of attachment holes formed on both sides of the optical fiber accommodating unit, said plurality of attachment holes including both screw holes and screw insertion through holes;
   an elastic member interposed between the notches of the side walls facing each other; and
protrusions disposed on confronting side surfaces of the holder body and extending above the upper surface of the holder body.

11. An optical fiber holder comprising:
a plurality of holder bodies laminated on one another, said holder bodies each having an upper surface and including:
   optical fiber guide notches formed at uniform intervals in side walls facing each other;
   an optical fiber accommodating unit having an inner flat surface which is an adhesive surface for positioning coated connection portions of optical fibers accommodated therein;
   a plurality of attachment holes formed on both sides of the optical fiber accommodating unit, said plurality of attachment holes including both screw holes and screw insertion through holes; and
   an elastic member interposed between the notches of the side walls facing each other; and
   protrusions disposed on confronting side surfaces of the holder body and extending above the upper surface of the holder body,
   wherein coupling screws are put into the screw holes of each lower one of the holder bodies via the screw insertion through holes of each corresponding upper one of the holder bodies.

12. A holder comprising:
a fiber accommodating unit comprising:
   a first body having first protrusions, and
   a second body having second protrusions opposite the first protrusions;
a plurality of attachment holes being respectively formed on both sides of the fiber accommodating unit, said plurality of attachment holes including both screw holes and screw insertion through holes;
an elastic member interposed between the first and second protrusions; and
third protrusions disposed on confronting side surfaces of one of the first and second bodies and extending above an upper surface of thereof.

13. An optical fiber holder comprising:
a holder body including an optical fiber accommodating unit having recess portions defined by first protrusions arranged side by side, coated connection portions of optical fibers being respectively accommodated in the recess portions; and a presser member attached to the holder body, said presser member having second protrusions opposite the first protrusions, shorter than the first protrusions, and covering the coated connection portions of the optical fibers.

14. An optical fiber holder comprising:
a holder body which includes:
   an optical fiber accommodating unit having recess portions defined by first protrusions arranged side by side, coated connection portions of optical fibers being respectively accommodated in the recess portions; and
   second protrusions on the rear surface of the optical fiber accommodating unit, said second protrusions opposite the first protrusions and being shorter than the first protrusions.

15. An optical fiber holder comprising:
a plurality of holder bodies which are laminated to one another, the holder bodies each comprising an optical fiber accommodating unit having recess portions defined by first protrusions arranged side by side, coated connection portions of optical fibers being respectively accommodated in the recess portions; and
a plurality of presser members, respectively attached to the plurality of holder bodies, each of the presser members comprising second protrusions opposite the first protrusions and being shorter than the first protrusions, and covering the coated connection portions of the optical fibers.

16. An optical fiber holder comprising:
a plurality of holder bodies which are laminated to one another, each of the holder bodies comprising an optical fiber accommodating unit having recess portions defined by first protrusions arranged side by side, coated connection portions of optical fibers being respectively accommodated in the recess portions; and
a plurality of second protrusions on the rear surfaces of the optical fiber accommodating units, said second protrusions opposite the first protrusions and being shorter than the first protrusions.

17. An optical member according to claim 15, further comprising an elastic member interposed between the coated connection portions of the optical fibers and either the presser member or the holder body.

18. An optical member according to claim 16, further comprising an elastic member interposed between the coated connection portions of the optical-fibers and either the first or the second protrusions.

19. An optical fiber holder comprising:
a holder body which has an upper surface and comprises:
   optical fiber guide notches formed at uniform intervals in side walls facing each other,
   an optical fiber accommodating unit having an inner flat surface which is an adhesive surface for positioning coated connection portions of optical fibers accommodated therein, and
   a plurality of attachment holes formed on both sides of the optical fiber accommodating unit, said plurality of attachment holes including both screw holes and screw insertion through holes;
a presser member attached to the holder body; and
protrusions disposed on confronting side surfaces of the holder body and extending above the upper surface of the holder body.

20. An optical fiber holder according to claim 19, further comprising an elastic member interposed between the coated connection portions of the optical fibers the optical fiber guide notches.

* * * * *